United States Patent
Gaurav et al.

(10) Patent No.: US 7,587,415 B2
(45) Date of Patent: Sep. 8, 2009

(54) SINGLE-PASS TRANSLATION OF FLAT-FILE DOCUMENTS INTO XML FORMAT INCLUDING VALIDATION, AMBIGUITY RESOLUTION, AND ACKNOWLEDGEMENT GENERATION

(75) Inventors: Suraj Gaurav, Issaquah, WA (US); Mathrubootham Janakiraman, Redmond, WA (US); Surendra Machiraju, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 364 days.

(21) Appl. No.: 11/079,424

(22) Filed: Mar. 14, 2005

(65) Prior Publication Data

US 2006/0206523 A1    Sep. 14, 2006

(51) Int. Cl.
 *G06F 7/00* (2006.01)
(52) U.S. Cl. .................................................. 707/103 Y
(58) Field of Classification Search ............... 707/103 Y
 See application file for complete search history.

(56) References Cited

U.S. PATENT DOCUMENTS

| | | | |
|---|---|---|---|
| 6,836,890 B1 * | 12/2004 | Watts, Jr. et al. | 719/313 |
| 6,996,589 B1 | 2/2006 | Jayaram et al. | |
| 7,421,458 B1 | 9/2008 | Taylor et al. | |
| 2002/0129059 A1 | 9/2002 | Eck | |
| 2002/0161749 A1 | 10/2002 | Pratt | |
| 2002/0178103 A1 | 11/2002 | Dan et al. | |
| 2003/0088543 A1 * | 5/2003 | Skeen et al. | 707/1 |
| 2003/0130845 A1 | 7/2003 | Poplawski | |
| 2003/0225770 A1 | 12/2003 | Lang et al. | |
| 2004/0088320 A1 | 5/2004 | Perry | |
| 2004/0139111 A1 | 7/2004 | Schoettger et al. | |
| 2004/0153405 A1 | 8/2004 | Millary et al. | |
| 2004/0177062 A1 | 9/2004 | Urquhart et al. | |
| 2004/0186840 A1 * | 9/2004 | Dettinger et al. | 707/100 |
| 2004/0205562 A1 | 10/2004 | Rozek et al. | |
| 2005/0091639 A1 | 4/2005 | Patel | |
| 2005/0108057 A1 * | 5/2005 | Cohen et al. | 705/3 |
| 2005/0114479 A1 | 5/2005 | Watson-Luke | |
| 2005/0138048 A1 | 6/2005 | Jin et al. | |
| 2005/0222996 A1 | 10/2005 | Yalamanchi | |
| 2005/0268217 A1 | 12/2005 | Garrison | |
| 2005/0273365 A1 * | 12/2005 | Baumgartner et al. | 705/3 |
| 2006/0064428 A1 | 3/2006 | Colaco et al. | |
| 2006/0101058 A1 | 5/2006 | Chidlovskii | |
| 2006/0161840 A1 | 7/2006 | Cohen et al. | |
| 2006/0179067 A1 | 8/2006 | Bechtel et al. | |
| 2007/0198539 A1 | 8/2007 | Warshavsky et al. | |

OTHER PUBLICATIONS

OA dated Oct. 20, 2008 for U.S. Appl. No. 11/079,582, 23 pages.
OA Dated Jun. 30, 2008 for U.S. Appl. No. 11/079,661, 35 pages.

* cited by examiner

*Primary Examiner*—Charles Rones
*Assistant Examiner*—Fazlul Quader
(74) *Attorney, Agent, or Firm*—Workman Nydegger

(57) ABSTRACT

Systems and methods are disclosed that facilitate formally describing structured documents and complex validation rules associated therewith using value-added XSD schemas (VAXs). In accordance with aspects of the invention, structured documents can be translated, parsed, validated, and acknowledged in a single pass via utilization of XSD schema representations that capture complex data and business rules related to validation as a translation specification to convert delimited flat-file and/or structured documents to an XML format while providing ambiguity resolution and acknowledgements.

16 Claims, 22 Drawing Sheets

SINGLE-PASS TRANSLATION OF FLAT-FILE DOCUMENTS INTO XML FORMAT INCLUDING VALIDATION, AMBIGUITY RESOLUTION, AND ACKNOWLEDGEMENT GENERATION

CROSS-REFERENCE TO RELATED APPLICATIONS

This application is related to co-filed U.S. patent application Ser. No. 11/079,661 entitled "COMPLEX SYNTAX VALIDATION AND BUSINESS LOGIC VALIDATION RULES, USING VAXs (VALUE-ADDED XSDs) COMPLIANT WITH W3C-XML SCHEMA SPECIFICATION" filed on Mar. 14, 2005, and co-filed U.S. patent application Ser. No. 11/079,582, entitled "SCHEMA GENERATOR: QUICK AND EFFICIENT CONVERSION OF HEALTHCARE SPECIFIC STRUCTURAL DATA REPRESENTED IN RELATIONAL DATABASE TABLES, ALONG WITH COMPLEX VALIDATION RULES AND BUSINESS RULES, TO CUSTOM HL7XSD WITH APPLICABLE ANNOTATIONS" filed on Mar. 14, 2005, the entireties of which are incorporated by reference herein.

TECHNICAL FIELD

This invention is related to integration brokers and message processing, and more particularly to formally describing structured documents and complex validation rules associated with such documents using annotated XSD schemas.

BACKGROUND OF THE INVENTION

The evolution of computers and networking technologies from high-cost, low-performance data processing systems to low-cost, high-performance communication, problem solving and entertainment systems has provided a cost-effective and time saving means to lessen the burden of performing every day tasks such as correspondence, bill paying, shopping, budgeting and information gathering. For example, a computing system interfaced to the Internet, via wire or wireless technology, can provide a user with a channel for nearly instantaneous access to a wealth of information from a repository of web sites and servers located around the world, at the user's fingertips.

With regard to business-to-business applications, message processing and routing is of paramount importance. Integration brokers can be employed to facilitate bi-directional communication between such applications, and are often employed to process millions of messages per day. Large messages require rapid and efficient processing. Modifying messages on an individual basis can be time-consuming and tedious. Thus, an unmet need exists in the art for systems and methodologies that overcome the aforementioned deficiencies.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, in one aspect thereof, comprises a model for formally describing structured documents, such as HL7 documents, in an XSD that can be annotated to include information related to validation rules that can be employed to validate document structure, data, and/or business rules, during translation of the document from a flat-file format to an XML format. Business rules and/or encoding rules defined in a persistent and relational format can be transformed into extensible markup language (XML) schema that provide message format and validation logic for the message. For example, a schema generator can receive data from a metadata relational database, such as flat-file-delimited data (e.g., a Health Level 7 document, . . . ) native XML schema definitions (XSDs), etc., and can reorganize and annotate (e.g., with business rules, encoding rules, validation rules, grouping orders, . . . ) such data to generate value-added XSDs (VAXs) that facilitate simultaneous conversion of a first message (e.g., document) into a plurality of message versions formatted for transmission to a plurality of different destination applications.

In another aspect of the subject invention, a system is provided that facilitates generating schema compatible with the Health Level 7 (HL7) standards body for application integration in the healthcare provider space. According to this aspect, a schema generator can receive a message that is in a delimited flat-file format and bound by encoding rules defined as "pipe-and-hat" (ER7-HL7). The schema generator can generate an XML schema from a relational database for each message type or transaction type. Messages can then be translated and/or transformed according to preconfigured rules specific to a destination to which the message is to be transmitted.

According to another aspect, validation can be performed at run time to effectuate efficient single-pass translation and validation of a document. Validation annotations can be associated with declarative validation rules with regard to respective nodes in an XSD. At run time, such declarative rules can be read and data related to the specific node associated with the annotation can be extracted and analyzed to perform validation. Meta data associated with document translation and validation is extremely compact and resides in memory, such that during validation database hits and/or disk input/output need not be performed.

According to a related aspect, validation handlers can be employed to facilitate run-time validation of document structure, data, and rules, during translation (e.g., single-pass validation and translation, . . . ). According to this aspect, a value-added XSD (VAX) can be generated with annotations that relate to validation handler routines that can act on information comprised by a specific schema node with which the annotation is associated in order to facilitate single-pass validation and translation at run time. Validation routines can be written and stored in a library to which a call can be placed upon identification of the annotation at the schema node at run-time, and the validation handler can verify that the proper data is present in a proper structure, etc.

According to another aspect of the subject invention, an integration engine can comprise a validation component and a parser/serializer component that facilitates single-pass conversion of documents between flat-file and XML formats, such that an incoming document can be parsed to glean information related to delimiters in the document, which in turn can be employed to configure a schema structure for the document. Additionally, the integration engine can comprise an ambiguity resolution component that can infer appropriate schema structure when ambiguity arises during document translation. A schema compiler component can be employed to compile a schema and generate a translation specification that represents the incoming document along with validation rules and/or annotations, document structure, follow set information, and any other suitable information relevant to performing a single-pass translation and validation of a structured document.

According to yet another aspect, the integration engine can comprise an acknowledgement generation component that receives information gleaned from a header associated with an incoming document to identify a source application for the document. The acknowledgement generation component can generate an acknowledgement regarding both receipt of the document and validation of content therein and can transmit the acknowledgement back to the source application over the same socket connection over which the document is received. In this manner, this aspect of the invention increases system efficiency and mitigates problems associated with conventional systems and/or methodologies, which typically transmit separate receipt and validation acknowledgements that are temporally distinct, which can result in acceptance of a first acknowledgement and rejection of a second causing a status mismatch.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
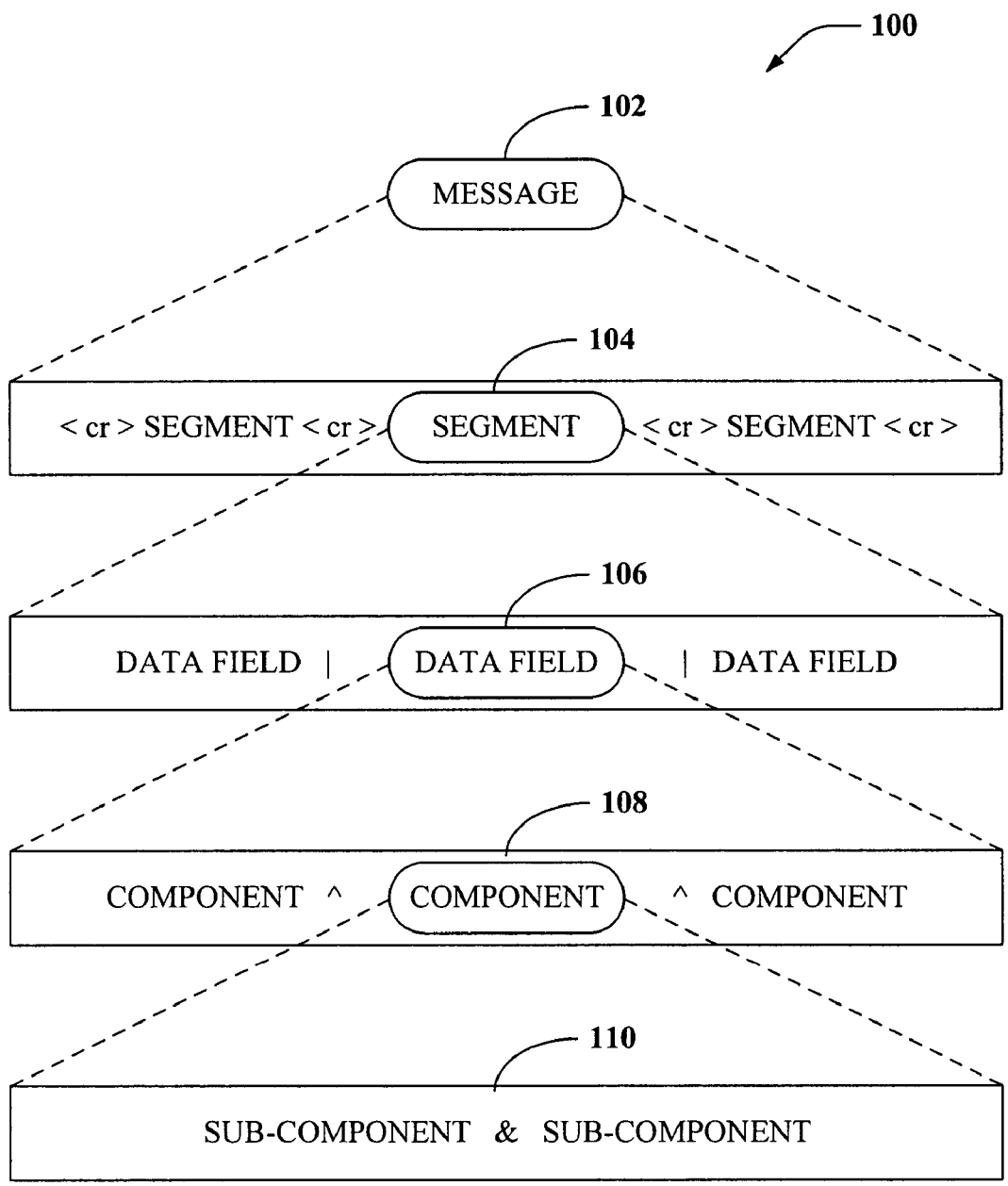
FIG. 1 illustrates a data arrangement 100 for a VAX that can be generated from delimited flat-file data, in accordance with an aspect of the subject invention.

The following terms are used throughout the description, the definitions of which are provided herein to assist in understanding various aspects of the subject invention.

Message: a business document that adheres to one of several well-defined structures that are unambiguously understood by different components of a processing system.

Message format: structural representation of a message, as defined by a business application that sends or receives the message, or as required by a specific industry standard that governs the semantics of the underlying message exchange.

HL7: Health Level Seven, HL7, is an American National Standards Institute (ANSI) approved standards developing organization (SDO). HL7 is considered to be the standards body for application integration in the healthcare provider industry.

ER7: also known as the 'pipe' and 'hat' encoding format. The encoding rules for data to be streamed as delimited flat files.

Message schema/XML schema, or XSD: the specification of the rules that define the set of all possible valid messages in a given message format.

HL7XSD: a representation of the HL7-ER7 encoding rules and structural data in relational database tables, along with complex validation rules and business rules, to customize HL7XSD with applicable annotations.

Message subschema: a subset of the message schema that describes portions of the message.

XSD Engine/Schema Generator/Integration Engine: a software program that is capable of performing both the translation process and the transformation process on a message.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, etc.) can be employed in connection with performing automatic and/or inferred action in connection with the subject invention.

Integration brokers or engines are common in business-to-business (B2B) and enterprise application integration (EAI) applications. The integration brokers can receive messages or data packets in widely varied formats, from various sources, via various transport mechanisms. Pre-configured business rules act on these messages and can trigger other actions. Business rules and validation logic are often expressed in specific forms, such as, for example, extensible markup language (XML) Schema. According to an aspect of the invention, an integration engine can employ a custom XML Schema definition language, such as an HL7XSD version of an XML Schema. Messages can then be routed to other destinations through specified transport mechanisms, after optionally undergoing translation into formats suitable for such destinations. A translation process need not alter the message content, but data in some portions of the message can be altered via a transformation process based on pre-configured rules that are specific to a destination. A single incoming message can thus be broadcast to multiple destinations in a message format acceptable to each destination to which it is broadcast.

The messages can undergo a translation process that converts them from source format to a canonical XML. Converting flat-file messages to XML format allows the messages to be manipulated effectively before they are routed to destination systems and/or applications. Document translation is a complex process involving conversion of source data that can be in a non-XML format to an XML format. In addition to performing the conversion, the subject integration engine can also check to ensure that the data in the message conforms to certain format and/or business rules. Business rules can be complex depending on the specific business application, and can be different for different message originators as well. It is not uncommon for message structures to be highly ambiguous resulting in translation process being more complex to resolve ambiguities.

The subject invention is a highly scalable engine that is capable of efficient message processing by performing translation, ambiguity resolution and complex business validation in a single-pass for arbitrarily large messages, common in vertical industries like healthcare and financial services. The engine uses an XSD schema representation that captures complex data and business rules required for validation, as a translation specification to convert delimited or structured documents such as HL7 documents, to XML format.

FIG. 1 illustrates a data arrangement 100 for a VAX that can be generated from delimited flat-file data, in accordance with an aspect of the subject invention. A message 102 can be reorganized to comprise one or more segments 104. Each segment 104 can comprise one or more fields 106, which can be delimited by the "|" symbol. Fields can comprise complex data types, simple data types, or a combination thereof. Additionally, fields can be optional. For example, a field's existence can be pendant from the existence of another field, a trigger event, etc. To further this example, a field for the name of a referring doctor is optional until an actual referral is entered and triggers the field's existence.

A field 106 can further comprise one or more components 108, which can also comprise simple data types, complex data types, or both. It will be noted that components 108 are delimited by the "^" symbol. Components 108 can still further comprise one or more subcomponents 110, which can be delimited by the "&" symbol. Subcomponents 110 typically comprise simple data types. Additionally, fields, components, and the like can be associated with one or more enumeration tables (not shown) that can define constant values that can be imported and/or selected (e.g., Mr., Mrs., Ms., Dr., . . . ). In this manner, message content information can be organized to facilitate generation of a VAX, as illustrated with regard to FIGS. 3-5.

Typically, five flat-file delimiters can be specified to facilitate parsing a message when employing ER7 delimiting standards. For example, a "|" symbol can be employed to delimit a particular data field within a segment, while a "^" symbol can be employed to delimit a component within the data field. A "&" symbol can be employed to delimit subcomponents within a component. Other delimiters can optionally include a "\" and a "~", which represent an escape character and a "repeating" delimiter, respectively. For example, the tilde can indicate that data represented in a component delimited thereby is repeated in the message. The backslash indicates that data following the backslash is in fact data, such that an ampersand contained therein is not to be interpreted as a delimiter, but rather as an ampersand. The following example illustrates a simple HL7 flat-file message comprising a header portion, a body portion, and Z-segments that comprise miscellaneous information, which can be parsed and regrouped into a structure similar to that illustrated in FIG. 1.

```
MSH|^~\&|srcAppsrc|srcFac|dstApp|dstFac|200307092343|sec|ADT^A01|
     msgid1|P|2.3.1|||AL
EVN|A01|198808181318||01
PID||M11|M11||JONES^WILLIAM^A^JR||19310615|M||C|123
     LOCAL DRIVE^ANYTOWN^ST^12345|GL|(999)555-
     1234|(999)555-4321||M|A|M11|987654321|143257NC
NK1|1|WIFE
PV1|1|I|2000|A|||004777,SMITH,JOHN,J.|||SUR|||||A0
ZSeg1|pid231 |any text
ZSeg2|other patient information
```

The above example comprises a message header portion denoted as "MSH," which comprises information related to the delimiter definition, HL7 version employed to create the message, and the like. For instance, "EVN" and "PID" denote segments within the message. The body portion of the message is that portion between the message header and the Z-segments in the message. Fields within an HL7 message can have specified data types associated therewith. For example, fields and components can comprise simple data types as well as complex data types, while subcomponents are typically of simple type. For example, the patient identity segment, "PID," comprises a plurality of fields. One such field comprises a patient name (William A. Jones Jr.) where the individual components of the patient's name within the field are delimited by "^" symbols.

Figure 2:
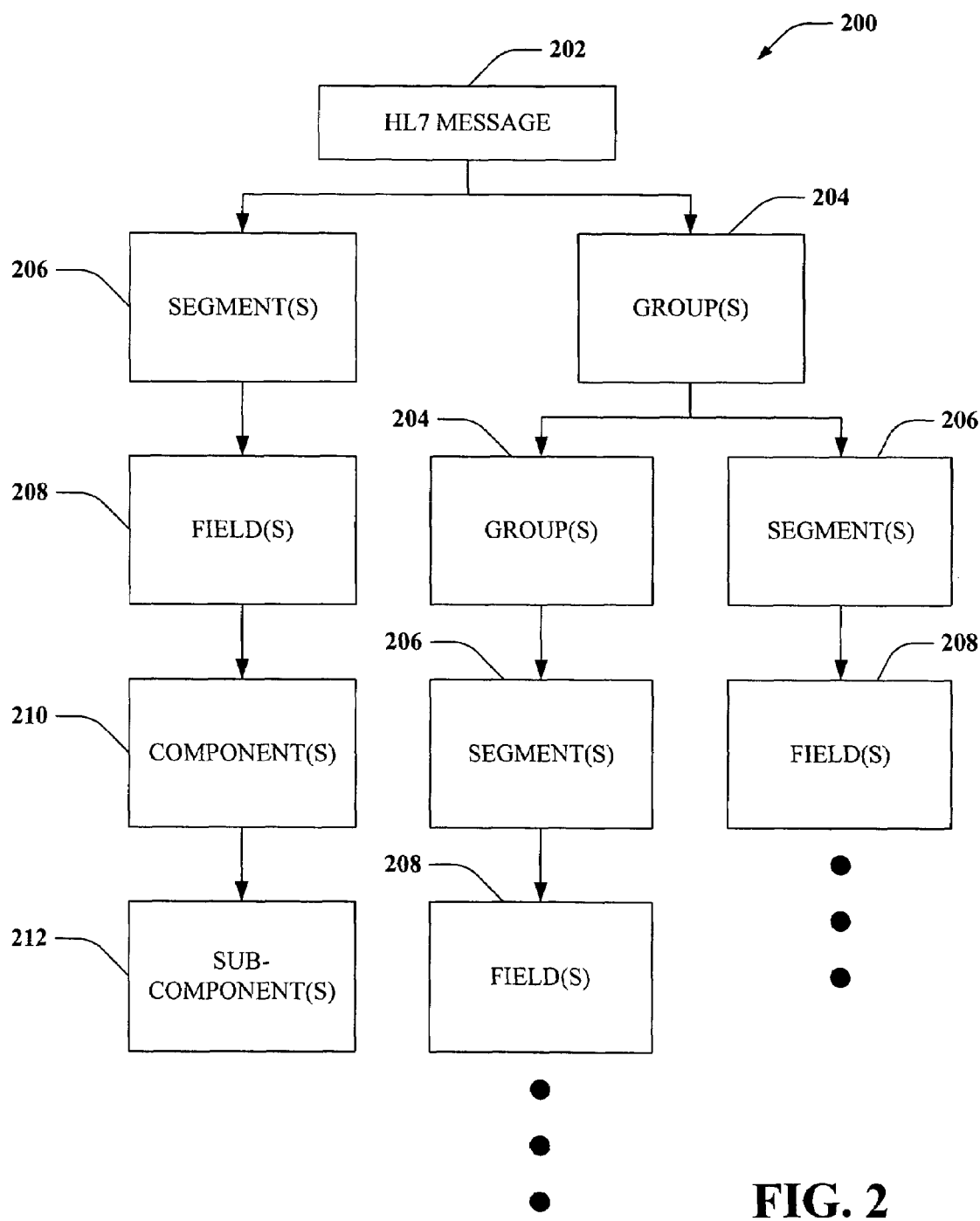
FIG. 2 is an illustration of a grouping hierarchy 200 that can be employed to facilitate generation of a VAX from flat-file delimited data.

FIG. 2 is an illustration of a grouping hierarchy 200 that can be employed to facilitate generation of a VAX from flat-file delimited data. The flat-file message format represented above does not permit segments to be grouped. Segments and/or portions thereof can be grouped by the systems and/or methodologies described herein according to "sequence" and/or "choice" methodologies and a VAX schema can be annotated to define such grouping formats. Additionally, groups can comprise other groups of segments. As illustrated, an HL7 message 202 can be parsed and reorganized into groups 204, which can comprise segments 206 and/or other groups 204 of segments 206. Segments 206 can further comprise fields 208, which in turn can comprise components 210. Finally, components 210 can comprise subcomponents 212. Data types associated with segments 206, fields 208, and/or components 210 can be of a simple type (e.g., int, string, . . . ) or a complex data type, while sub-component 212 data is typically of a simple type.

Encoding rules used to encode a VAX can comprise, for example, limitations on the number of segments in a group, fields in a segment, components in a field, sub-components in a component, etc. For instance, a segment related to insurance information can be limited to 3 fields, such as "primary insurance," "secondary insurance," and "supplemental insurance." According to another example, a data field such as an "emergency contact" in a PID segment can be limited to 4 components, such as "last name," "first name," "title," and "10-digit phone number." According to yet another example, business rules can be defined such that they are subject to change at a specific time. For instance, a first business rule can be tagged as being valid up to a certain date, such as December 31 of a given year, and a second business rule can be tagged as being valid after December 31 of that year, such that at 12:00 a.m. on January 1, the second business rule will be employed to the exclusion of the first. According to this example, the temporal point of 12:00 a.m. January 1 can be a trigger event.

Figure 3:
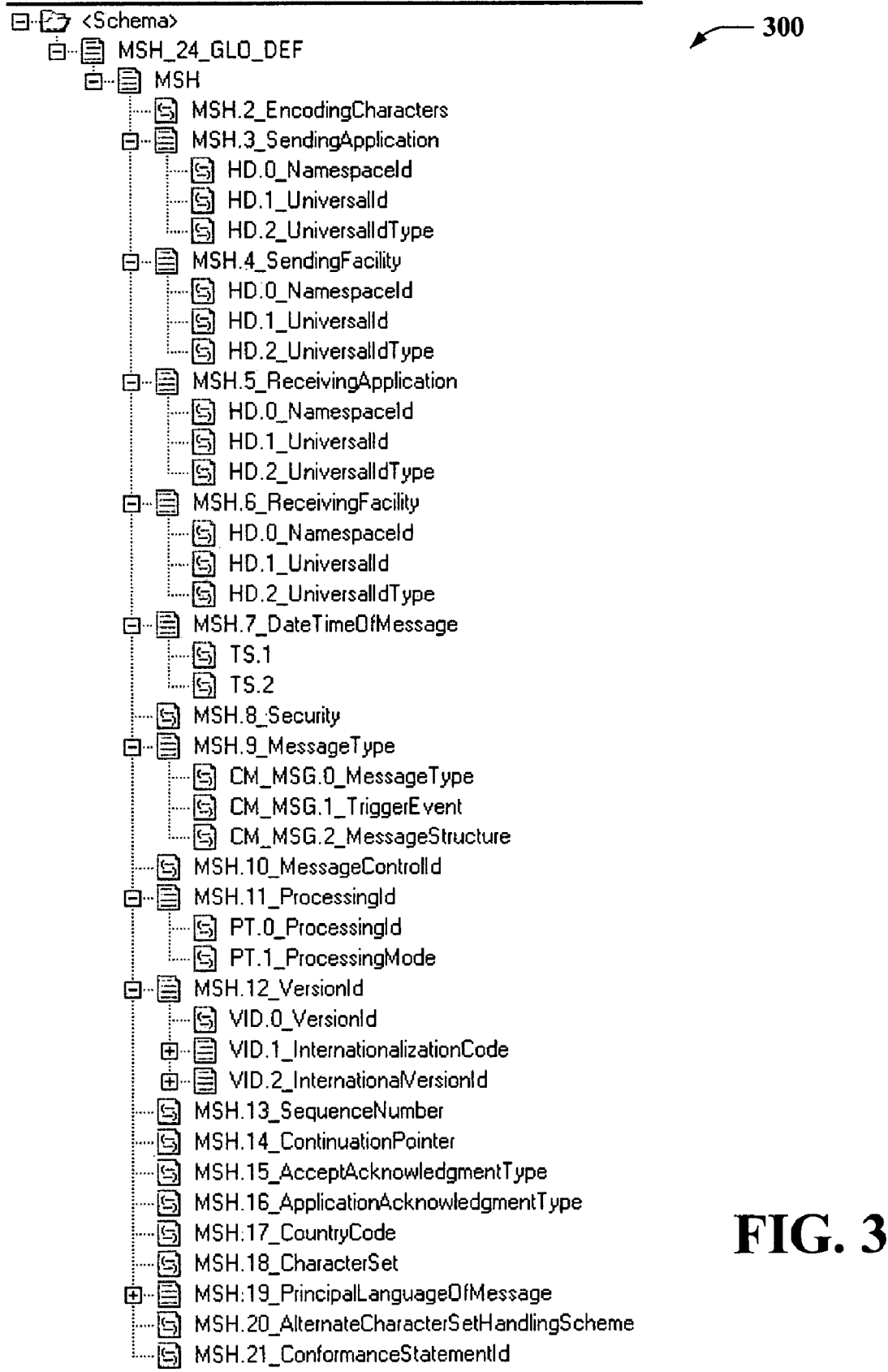
FIG. 3 illustrates a VAX 300 that represents header segments in accordance with an aspect of the subject invention.

FIG. 3 illustrates a VAX 300 that represents header segments in accordance with an aspect of the subject invention. The VAX is illustrated in a tree-view format that has expandable nodes arranged in a hierarchical manner. A primary branch of the VAX tree is labeled "MSH_24_GLO_DEF," indicating that header nodes pending from that branch are globally defined, such that annotations and/or changes made thereto can be provided to change segment, field, component sub-component, etc., at a single location and messages generated thereafter can comprise such updated information and/or schemas. For example, a first node within the global definition branch labeled "MSH" and comprises a plurality of other message header nodes MSH.2-MSH.21. Each of the message header nodes respectively comprises one or more header definitions (e.g., HD.0_NamespaceId, . . . ).

Figure 4:
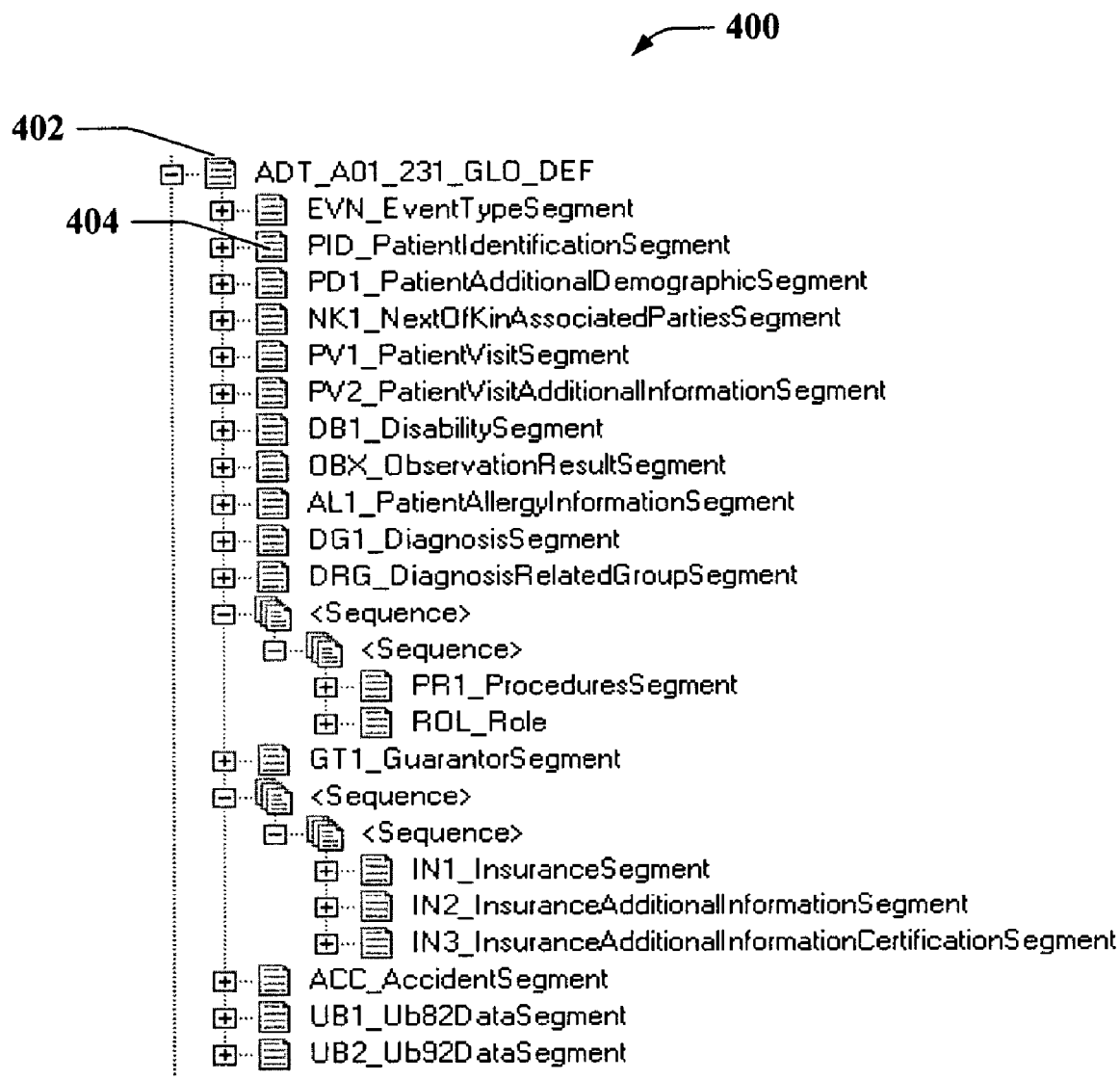
FIG. 4 is an illustration of a tree-view of a VAX 400 representing a body segment of HL7 messages in accordance with an aspect of the subject invention.

FIG. 4 is an illustration of a tree-view of a VAX 400 representing a body segment of HL7 messages in accordance with an aspect of the subject invention. The initial header 402 is labeled "ADT_A01_231_GLO_DEF" and indicates that the message is related to admissions information and provides a global definition for such information. A header for a patient information segment 404 is illustrated as the second primary branch on the VAX tree. Data values changed in the VAX can be globally updated.

Figure 5:
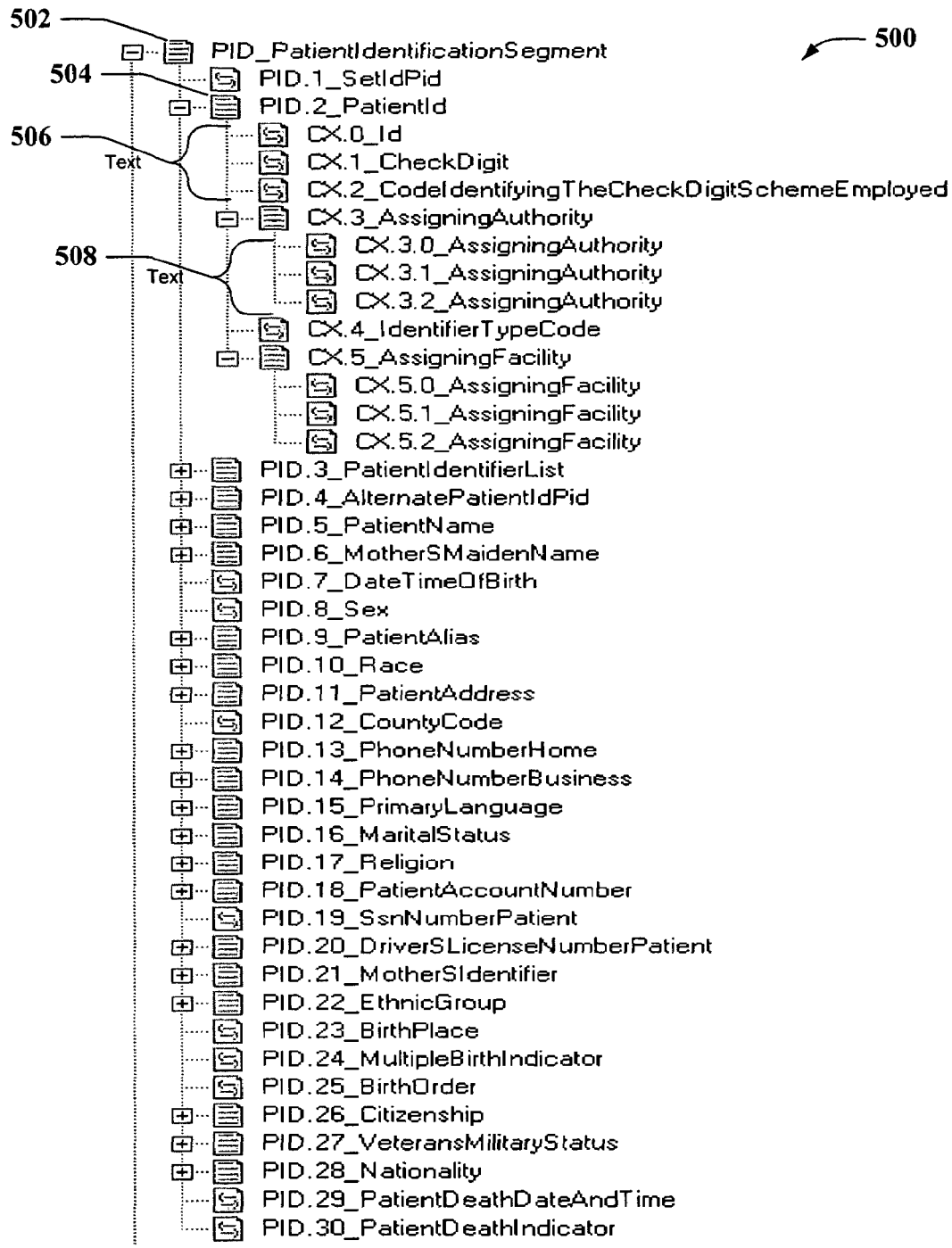
FIG. 5 illustrates a tree-view of a PID segment in a VAX 500 in accordance with an aspect of the subject invention.

FIG. 5 illustrates a tree-view of a PID segment in a VAX 500 in accordance with an aspect of the subject invention. The VAX 500 comprises a hierarchical structure with a PID segment 502 that comprises a plurality of data fields 504 (e.g., PID.1_SetIdPid, PID.2_PatientID, . . . ). The PID.2_PatientId field 504 is expanded to illustrate components 506 thereof (e.g., CX.0_Id, CX.3_AssigningAuthority, . . . ). A component 506 is further expanded to illustrate subcomponents 708 thereof (e.g., CX.3.1_AssigningAuthority, . . . ). Children of respective parent nodes can be arranged according to one or both of sequence and choice ordering schemes. Such ordering schemes can be defined by encoding rules associated with a particular application with which the subject invention is employed, and annotations regarding such encoding rules can be added when generating a VAX.

Figure 6:
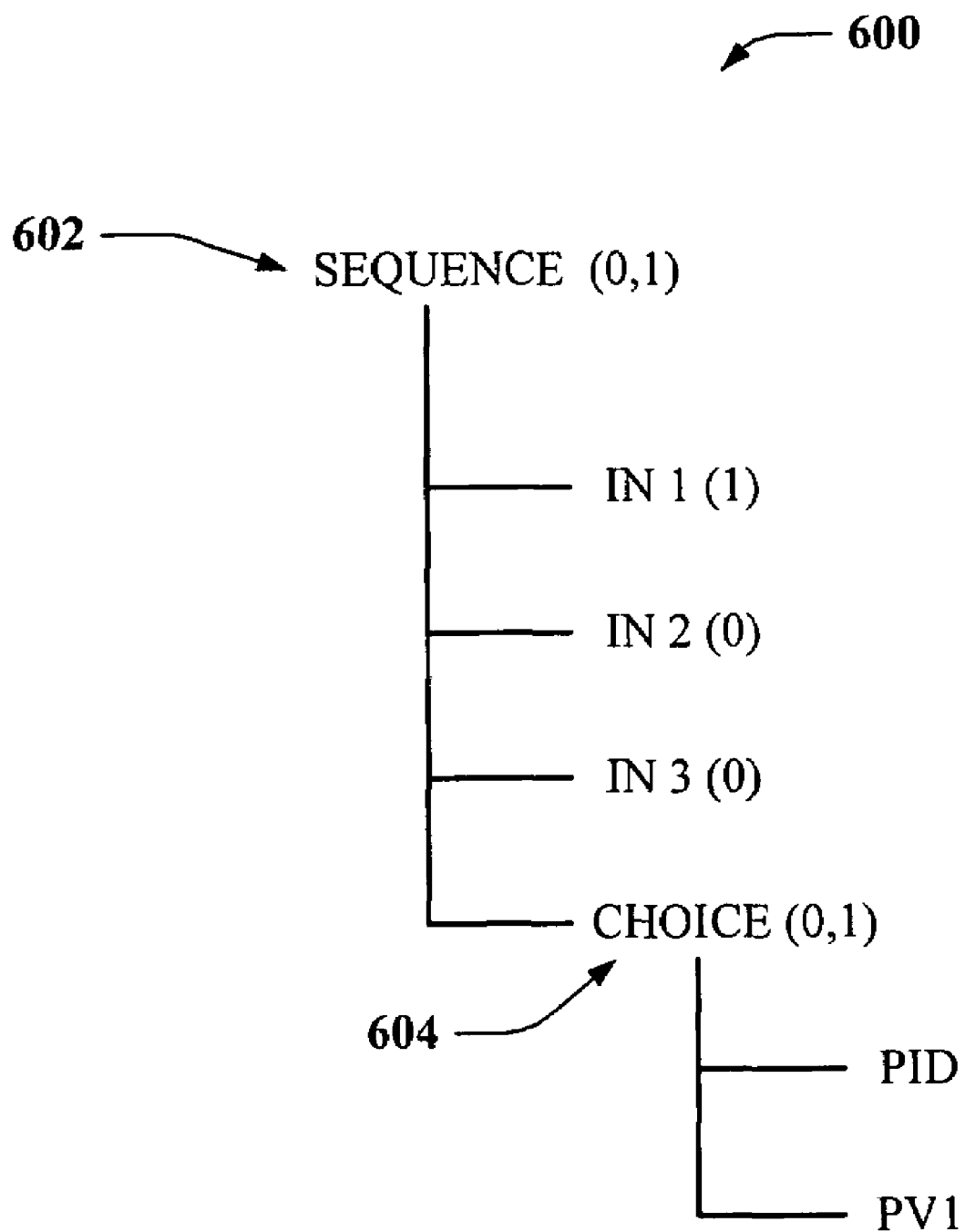
FIG. 6 is an illustration of a simple ordering structure 600 that depicts both choice and sequence ordering arrangements for grouping segments, in accordance with an aspect of the subject invention.

FIG. 6 is an illustration of a simple ordering structure 600 that depicts both choice and sequence ordering arrangements for grouping segments, in accordance with an aspect of the subject invention. Headers, nodes associated therewith, and the like can be ordered using either "choice" or "sequence" grouping strategies, or a combination thereof. For example, information and/or nodes ordered in sequence are defined such that child elements appear sequentially, and each child element can appear between 0 and n times, where n is an integer. Nodes grouped according to a choice ordering can be specified such that one of a plurality of child elements can occur to the exclusion of other child elements of the same parent. Choice and sequence ordering schemes and/or requirements can be integrated into a VAX as annotations thereto.

According to the figure, a patient's insurance data is shown as having three segments (e.g., IN1, IN2, and IN3 ). The VAX structure comprises a sequence ordering 602 that has occurrence indicators of (0,1), indicating that each of the "insurance" child segments IN1, IN2, and IN3 can occur 0 or 1 times. Because IN1 is present as illustrated by the (1), IN2 and IN3 are optional as indicated by (O). The sequence 602 further comprises a choice ordering 604, in which either a patient identification segment (PID) or a first patient visit segment (PV1) can exist. In this manner, three different payment methods can be grouped with either a patient's identity or with a particular patient visit. It is to be appreciated that the foregoing example is presented for illustrative purposes and is not intended to limit the number of segments or identities thereof that can be grouped and/or ordered by the subject invention.

Figure 7:
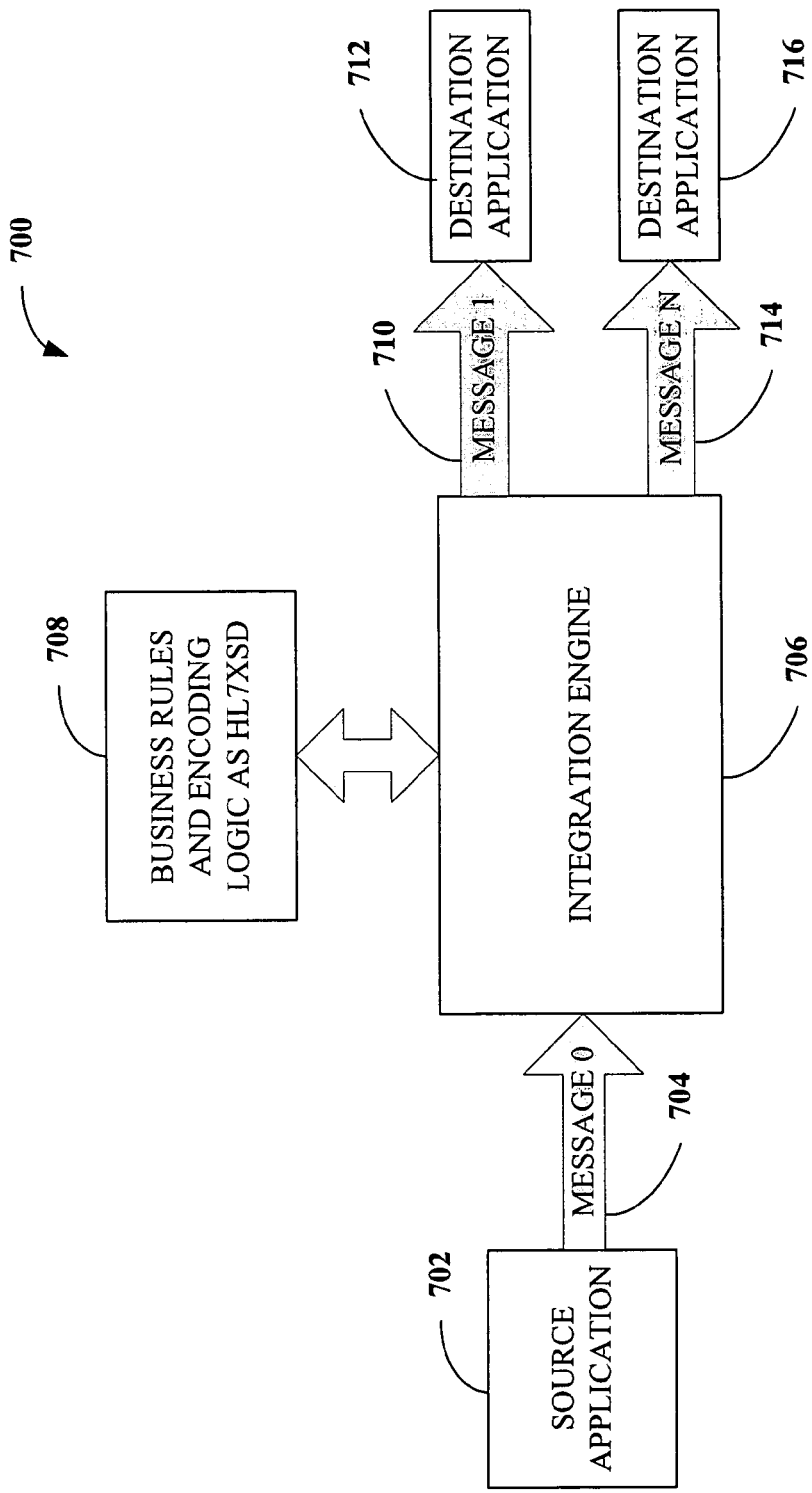
FIG. 7 is an illustration of a system 700 for converting a flat-file-formatted message into one or more VAX-enhanced messages in accordance with an aspect of the subject invention.

FIG. 7 is an illustration of a system 700 for converting a flat-file-formatted message into one or more VAX-enhanced messages in accordance with an aspect of the subject invention. The system 700 comprises a source application 702 that transmits a message 704 to an integration engine 706, which can be similar to and/or comprise a schema generator described infra with regard to FIGS. 10 and 11. The message 704 can be formatted, for instance, as a flat-file native XSD and can contain data related to a particular patient in a health care environment. An HL7XSD (e.g., a VAX) 708 comprising business rules and/or encoding logic germane to the particular health care environment in which the system 700 is employed can be utilized by the integration engine 706 to reformat and validate data in the message 704 in order to generate one or more output messages 710 and 714. The reformatted messages 710 and 714 can then be transmitted to respective destinations 712 and 716. For instance, the source application 702 can be associated with an admissions unit at a health care facility. Upon entry of patient identification information, insurance information, symptom information, etc., a flat-file message 704 comprising such information can be transmitted to the integration engine 706. The integration engine 706 can parse the message 704 and regroup information therein into a VAX format.

For example, a VAX-formatted message 710 can be generated and transmitted to a history application 712, which can generate an acknowledgement and/or update any and all historical data related to the admitted patient. Additionally and/or alternatively, a message 714 can be formatted and transmitted to a financial transaction application 716, wherein patient insurance information, payment method information, balance information, and the like can be stored, updated, etc. For instance, a financial transaction application might typically consume fifty types of messages. Modifying a locally identified value fifty times can be tedious and detrimental to system function. However, by modifying the value globally (e.g., in the schema), the system 700 can streamline message transmission and processing efficiency. Other application destinations to which messages can be transmitted from the integration engine can include without being limited to, for example, a triage application where priority information can be stored and/or updated, a laboratory application where information related to lab workups can be received and/or prepared, and the like.

It is to be appreciated that the HL7 engine 706 can detect changes in schemas at run-time and use the modified versions for document processing. The system 700 allows a user to change the engine's behavior dynamically, without restarting the system 700. Additionally, the engine facilitates co-existence of multiple schema versions belonging to different business partners and/or applications. A schema selection algorithm can determine the correct version of the schema based on the input document.

Figure 8:
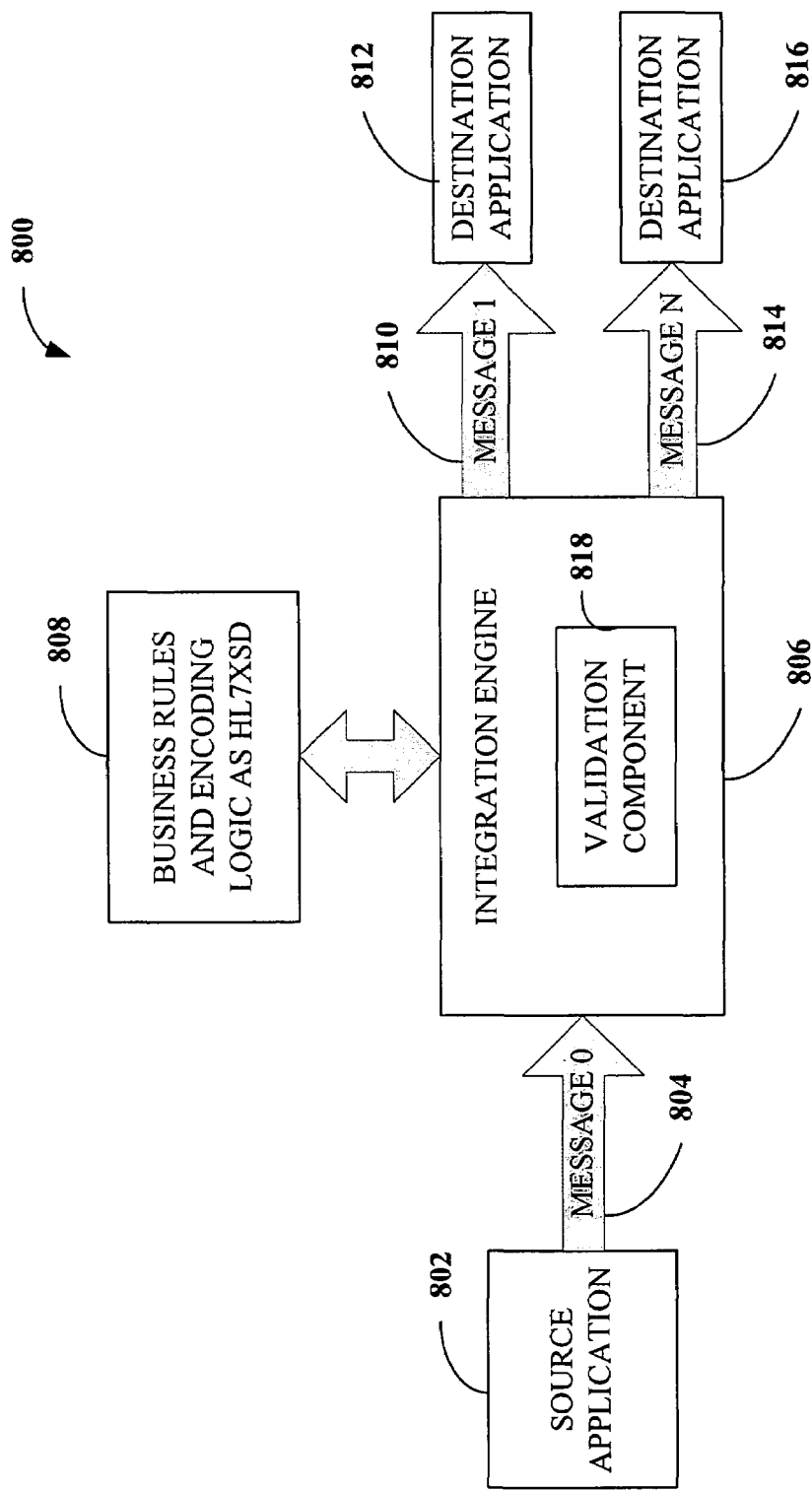
FIG. 8 is an illustration of a system 800 for converting a flat-file-formatted message into one or more VAX-enhanced messages in accordance with an aspect of the subject invention.

FIG. 8 is an illustration of a system 800 for converting a flat-file-formatted message into one or more VAX-enhanced messages in accordance with an aspect of the subject invention. The system 800 comprises a source application 802 that can transmit a flat-file-delimited message 804 to an integration engine 806. The engine has powerful data validation capabilities. The scope of validation rules can range from rules for atomic data entities to highly complex complicated validation rules that encapsulate combinations of segments, fields and their constituents. The meta-data for document translation and validation is highly compact and can reside completely in memory. The engine 806 need not perform database hits or disk I/O during document validation. Additionally, validation logic can be extended by plugging-in handlers at runtime, as will be described infra with regard to FIG. 9.

The flat-file message 804 can be formatted, for instance, as a native XSD and can contain data related to a particular patient and/or occurrence related to a health care environment. An HL7XSD (e.g., a VAX) 808 comprising business rules and/or encoding logic germane to the particular health care environment in which the system 800 is employed can be utilized by the integration engine 806 to reformat and validate data in the flat-file message 804 in order to generate one or more output messages 810 and 814. The reformatted messages 810 and 814 can then be transmitted to respective destinations 812 and 816. For instance, the source application 802 can be associated with an admissions unit at a health care facility. Upon entry of patient identification information, insurance information, symptom information, etc., a flat-file message 804 comprising such information can be transmitted to the integration engine 806. The integration engine 806 can parse the message 804 and regroup information therein into a VAX-enhanced XML format.

The integration engine 806 further comprises a validation component 818 that facilitates utilizing complex validation rules described in a VAX. Such validation rules can extend XSD capabilities to define data validation for non-XSD data types, as well as syntax validation rules and/or business rules that can apply to specific source and/or destination applications that respectively transmit and receive messages manipulated by the integration engine 806. For example, a VAX such as an HL7XSD 808 can be employed to express and/or represent HL7 data. According to this example, a VAX schema can comprise a number of segments and/or groups that comprise segments. Groups can be either choice or sequence, as detained with regard to FIG. 6. Each segment can comprise on or more fields, which can repeat and can be of a simple data type or can have components that describe a complex data type in a field. Additionally, a component can represent an atomic data type or can have one or more sub-components, which typically comprise data of a simple type. The VAX schema comprises all sub-components in the hierarchy regardless of whether a specific sub-component delimiter is present in the instance, as illustrated supra with regard to FIGS. 3-5. Schemas themselves need not comprise delimiter information: delimiters can be applied to the schema when the document represented thereby is translated.

Data validation rules can be represented by the HL7XSD 808 (e.g., VAX, . . . ) as well. For example, certain validation rules can apply to leaf-level nodes of the VAX, and annotations pertaining thereto can be provided in the VAX such that at runtime the validation component 818 can assess validation rules associated with the annotated VAX and can validate data in messages. For instance, data types (e.g., int, string, . . . ) in the nodes can be supported natively by an XSD. Additionally, data types in the schema and/or nodes thereof can be custom data types that are recognized by the integration engine 806. For example, with regard to HL7 data, such data types can comprise "DateTime," "TimeStamp," "TelephoneNumber," etc.

Additionally, cross-validation and business rules can be represented in the HL7XSD 808 and can be assess and/or utilized by the validation component 818 at translation time to validate information in a message. For example, specific business rules can operate on data residing at one or more nodes in the schema. To further this example, a business rule can dictate that "if node x is valued, then node y should also be valued. The VAX can represent such business rules and the validation component 818 can extract sufficient data from a schema to perform validation of the rule at run time (e.g., the validation component 818 can ensure that if x is valued y is also valued, . . . ). In this manner, the validation component 818 facilitates performing a single pass of a flat-file message 804 or document at run time for translation as well as validation of document structure, data, and rules.

Figure 9:
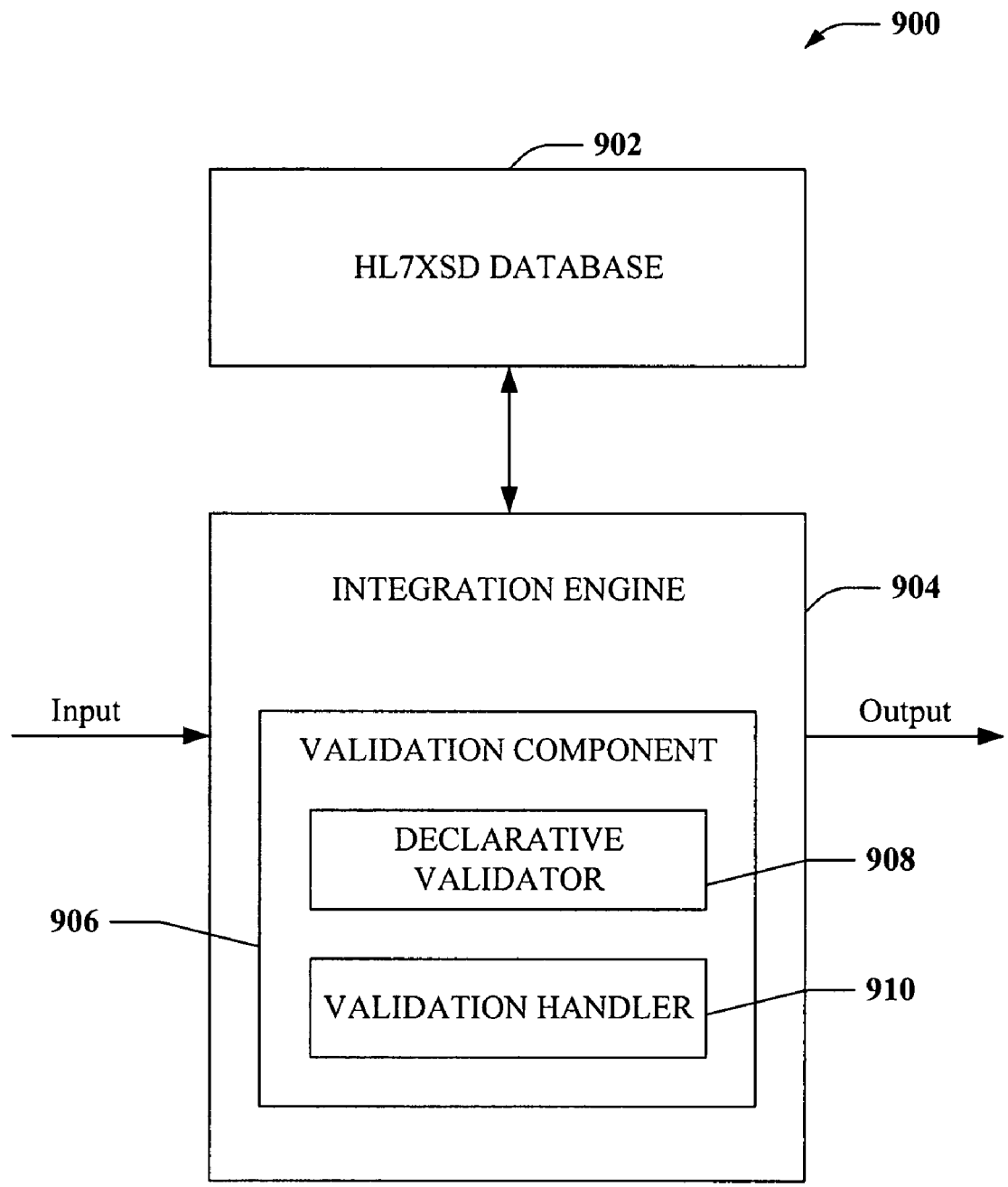
FIG. 9 is an illustration of a system 900 that facilitates providing single pass translation of a flat-file document along with validation of document structure, data, and business rules associated with the document, in accordance with an aspect of the subject invention.

Now referring to FIG. 9, there is illustrated a system 900 that facilitates providing single pass translation of a flat-file document along with validation of document structure, data, and business rules associated with the document, in accordance with an aspect of the subject invention. The system 900 comprises a VAX database 902 that stores VAXs associated with messages that can be received by an integration engine 904. The integration engine 904 comprises a validation component 906 similar to the validation component described with regard to FIG. 8. The validation component 906 further comprises a declarative validator 908 that facilitates employing declarative rules to validate a message and a validation handler 910 that can comprise a predefined library of validation routines that can be performed on messages being translated by the integration engine 904. The declarative validator 908 and the validation component 910 can be used in conjunction with each other and/or can be used separately to facilitate data validation.

For example, XSD annotations that describe declarative rules can be specified at the nodes of a VAX. The integration engine 904 can parse the annotations to read through them, and the declarative validator 908 can apply the rules to relevant portions of the document or message being modified by the integration engine 904. An example of such an annotation is presented below. In the ADT_A01 schema (FIG. 4), if component CX.0_Id of PatientId (FIG. 5) is valued, then DateTimeOfBirth (FIG. 5) should also be valued. In this case, the schema can be annotated to contain the following:

```
<xs:annotation>
    <xs:appinfo>
        <ruleNS:CrossFieldValidationRule>
            <ruleNS:Condition>
                <ruleNS:XPath>PID__PatientIdentificationSegment PID.
                    2_PatientId CX.0_Id</ruleNS:XPath>
                <ruleNS:Operator>is</ruleNS:Operator>
                <ruleNS:Value>NotNull</ruleNS:Value>
            </ruleNS:Condition>
            <ruleNS:Then>
                <ruleNS:XPath>PID__PatientIdentificationSegment
                    PID.7__DateTimeOfBirth</ruleNS:XPath>
                <ruleNS:Operator>is</ruleNS:Operator>
                <ruleNS:Value>NotNull</ruleNS:Value>
            </ruleNS:Then>
        </ruleNS:CrossFieldValidationRule>
    </xs:appinfo>
</xs:annotation>
```

The language employed to describe the rules can be arbitrarily complex, and the engine 904 can be designed to ensure that it is capable of interpreting the complex language.

According to a related example, the validation handler 910 can be specified using XSD annotations in the VAX. One or more validation handlers 910 can be written and stored as a library with predefined routines for performing validation. For instance, a validation handler 910 can be designed that dynamically looks up information from other sources, tables, etc., to provide real-time validation when relevant. For example, real-time validation can be useful to validate a stock symbol or quote, a baseball score, and/or any other information type that is likely to change frequently. The following is an example of a validation handler annotation that can be specified in a VAX. In ADT_A01 schema, the value of component CX.0_Id of PatientId can only take values from a given set. This set can be retrieved at runtime by making a call to a helper routine. In this case, the schema can be annotated to contain the following:

```
<xs:annotation>
    <xs:appinfo>
        <ruleNS:DataRestrictionRule>
            <ruleNS:NodeXPath>
                PID__PatientIdentificationSegment PID.
                    2_PatientId CX.0_Id</ruleNS:XPath>
            </ruleNS: NodeXPath >
            <ruleNS:ValidationHandler>
                <ruleNS:AssemblyName>ValidationUtilities</ruleNS:
                AssemblyName>
                <ruleNS:ClassName>PIDValidation
                </ruleNS:ClassName>
                <ruleNS:MethodName>ValidatePID1
                </ruleNS:MethodName>
            </ruleNS:ValidationHandler >
        </ruleNS:DataRestrictionRule >
    </xs:appinfo>
</xs:annotation>
```

Figure 10:
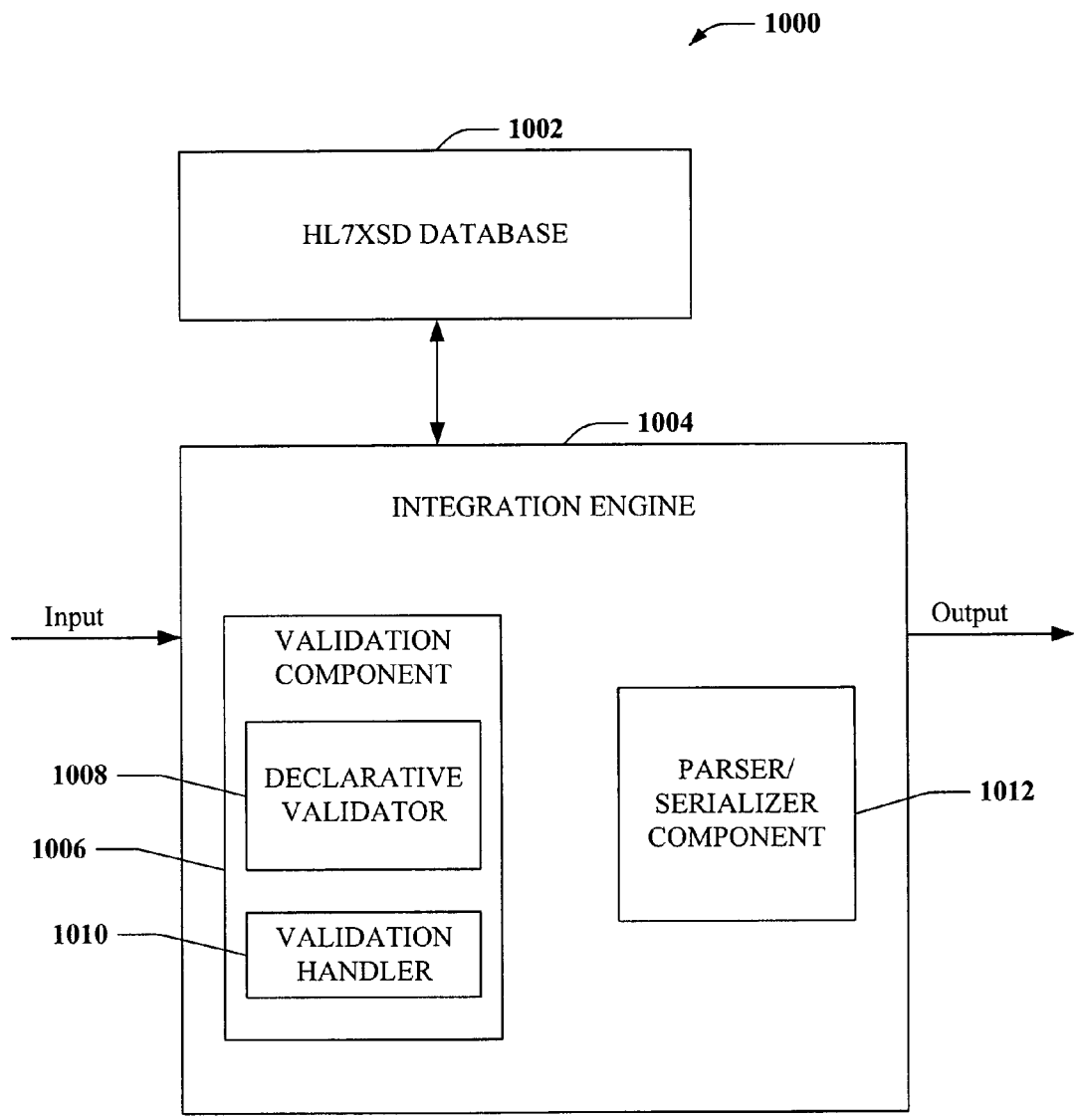
FIG. 10 is an illustration of a system 1000 that facilitates providing single pass translation and validation of a flat-file document, comprising a parser/serializer component, in accordance with an aspect of the subject invention.

FIG. 10 is an illustration of a system 1000 that facilitates providing single pass translation and validation of a flat-file document, comprising a parser/serializer component, in accordance with an aspect of the subject invention. The system 1000 comprises a VAX database 1002 that stores VAXs associated with messages that can be received as input by an integration engine 1004. The integration engine 1004 comprises a validation component 1006 similar to the validation component described with regard to FIGS. 8 and 9. The validation component 1006 further comprises a declarative validator 1008 that facilitates employing declarative rules to validate a message and a validation handler component 1010 that can comprise a predefined library of validation routines that can be called and performed on messages and/or portions thereof being translated by the integration engine 1004. The integration engine 1004 still further comprises a parser/serializer component 1012 that can produce data on demand (e.g., can be a pull-based parser and/or serializer, . . . ). The parser/serializer component 1012 can be designed with intelligence to permit it to consume precisely a requested amount of data (e.g., XML, flat-file, . . . ) and convert it to a destination format. For instance, flat-file information can be parsed to facilitate conversion to XML format; XML-formatted data can be serialized to facilitate conversion to flat-file format, etc. The integration engine 1004 can receive parsed and/or serialized information from the highly performant parser/serializer component 1012 to facilitate processing of arbitrarily large documents while mitigating over-consumption of system resources. Such can be achieved because, although HL7 data resides in flat-file delimited format, the integration engine 1004 employs XSDs and/or VAXs to represent HL7 documents, which contain rich information (e.g., annotations, . . . ) that can be employed by the integration engine 1004 when converting documents between formats.

At run time, a VAX can be converted to a compact representation, such as a translation specification, and cached. Such compact representation facilitates storing multiple schemas in a database at a given time, and mitigates a need for database/disk-based operations associated with retrieving a translation specification once a document has been processed. The integration engine 1004 can additionally perform translation of a document in chunks to mitigate a need to store an entire document in memory and increasing system scalability. Such is particularly useful when considering that parsing a document and converting to XML can result in a 10-fold increase in file size.

Figure 11:
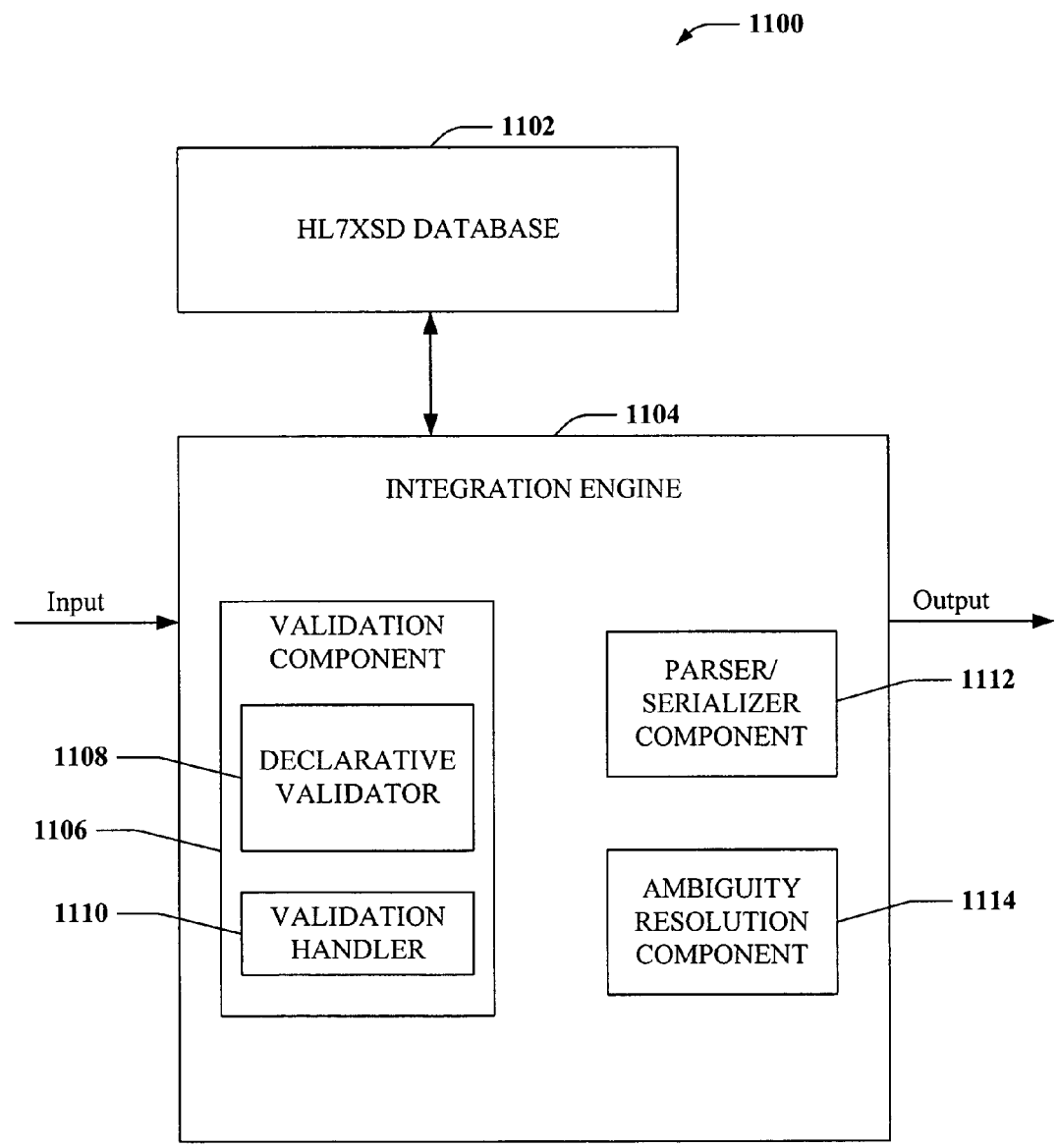
FIG. 11 is an illustration of a system 1100 that facilitates providing single pass translation and validation of a flat-file document while providing ambiguity resolution functionality, in accordance with an aspect of the subject invention.

FIG. 11 is an illustration of a system 1100 that facilitates providing single pass translation and validation of a flat-file document while providing ambiguity resolution functionality, in accordance with an aspect of the subject invention. The system 1100 comprises a VAX database 1102 that stores VAXs associated with messages that can be received as input by an integration engine 1104. The integration engine 1104 comprises a validation component 1106 similar to the validation component described with regard to FIGS. 8 and 9. The validation component 1106 further comprises a declarative validator 1108 that facilitates employing declarative rules to validate a message and a validation handler component 1110 that can comprise a predefined library of validation routines that can be called and performed on messages and/or portions thereof being translated by the integration engine 1104. The integration engine 1104 still further comprises a parser/serializer component 1112 and an ambiguity resolution component 1114.

The ambiguity resolution component 1114 can facilitate determining a proper resolution for ambiguities that arise in HL7 data and/or are transferred to a VAX representing such data in XML format. As such, the integration engine 1104 can employ the ambiguity resolution component 1114 to keep track of segments occurring in an instance as well as a sufficient amount of data related to segment context. When an ambiguity is detected, it can be resolved in favor of a schema node that has a closest Cartesian proximity to the node being processed (e.g., the ambiguity).

Figure 12:
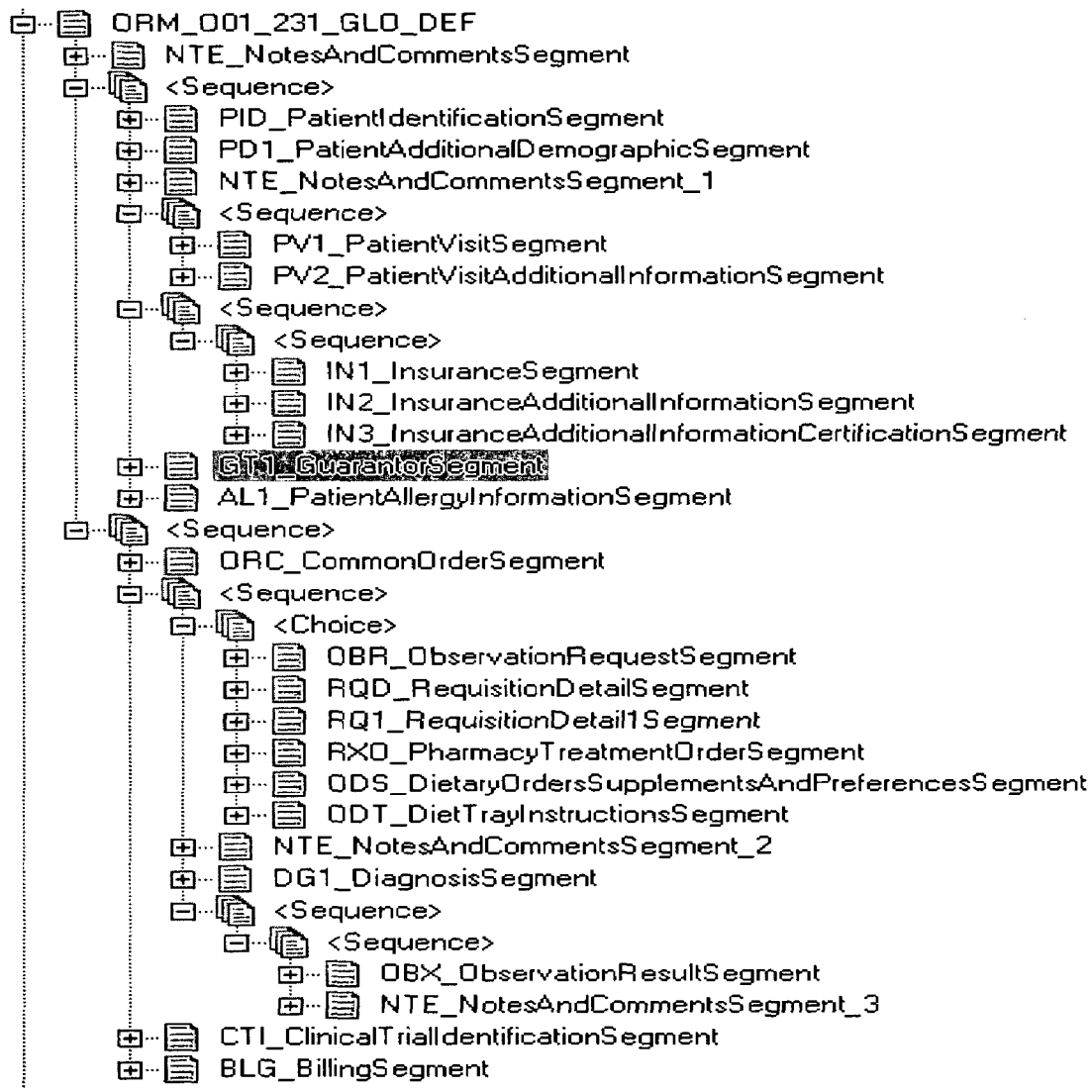
FIG. 12 illustrates a sample schema that is presented to facilitate understanding of the ambiguity resolution functionality of the system 1100, in accordance with an aspect of the subject invention.

For example, FIG. 12 illustrates a sample schema that is presented to facilitate understanding of the ambiguity resolution functionality of the system 1100, in accordance with an aspect of the subject invention. As illustrated, several note and comment segments are present in the schema (e.g., NTE_NotesAndCommentsSegment, NTE_NotesAndCommentsSegment_1, etc.) in order to avoid ambiguity. However, in some instances, flexibility to rename segments to avoid ambiguity may not be present. Thus, when parsing, the integration engine 1104, via the ambiguity resolution component 1114, can determine a node closest to an encountered NTE node and correlate it with the NTE node. Logic associated with the ambiguity resolution component 1114 can account for complex grouping arrangements with regard to the sequences, including nesting of sequences, choices, an/or the cardinality thereof. When parsing a document via the parser/serializer component 1112, the integration engine 1104 can maintain instance-specific information, such as a number of times a segment has occurred, a context in which it has occurred, a stack of states representing a current position of the segment in a schema, etc. When an ambiguous segment is encountered, the ambiguity resolution component 1114 can direct the parser/serializer component 1112 to a segment closest to the ambiguous node, and the parser/serializer component 1112 can employ information associated with that segment to continue parsing/serializing the remainder of the ambiguous segment.

For example, if a schema has a grouping defined by:
NTE (0,2)
Seq (0,1)
NTE1 (0,1)
PID
NTE2 and flat-file data associated with the schema has the following segments:
NTE|...
NTE|abc|def
NTE|yyy
PID|1
NTE|abc then the first two NTE pieces of data can be matched to NTE in the schema, since it can occur 2 times at most (e.g., as denoted by the "(0,2)" annotation). The third data NTE can be matched to the schema NTE1 under the Sequence. PID can be matched to the sibling of NTE1. The final data NTE does not match NTE1 in the schema because "Seq" can only occur once. Thus, the final data NTE can be resolved to match schema NTE2, which is outside of "Seq."

Figure 13:
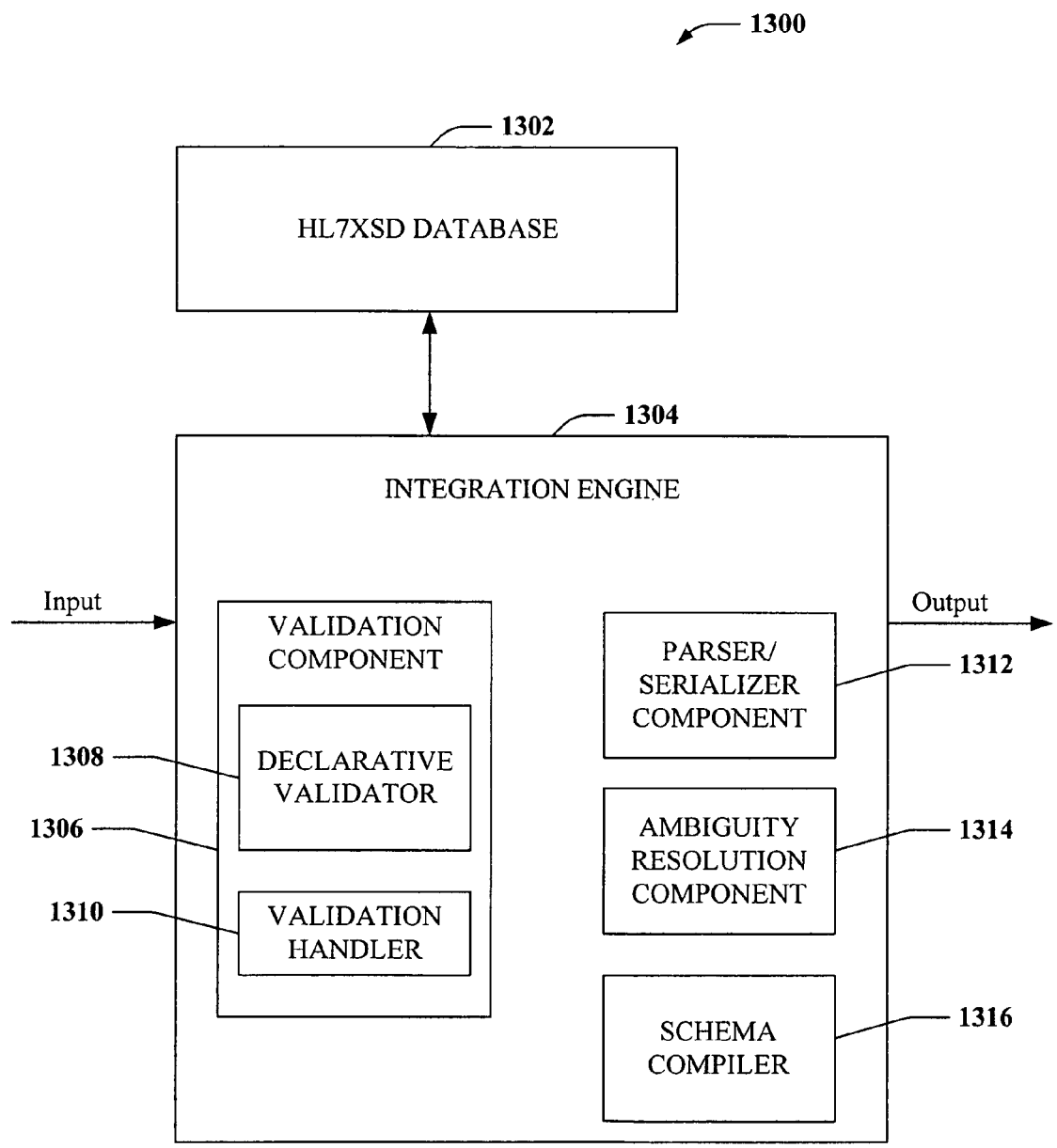
FIG. 13 is an illustration of a system 1300 that facilitates providing single pass translation and validation of a flat-file document as well as schema compiling functionality, in accordance with an aspect of the subject invention.

FIG. 13 is an illustration of a system 1300 that facilitates providing single pass translation and validation of a flat-file document as well as schema compiling functionality, in accordance with an aspect of the subject invention. The system 1300 comprises a VAX database 1302 that stores VAXs associated with messages that can be received as input by an integration engine 1304. The integration engine 1304 comprises a validation component 1306 similar to the validation component described with regard to FIGS. 8 and 9. The validation component 1306 further comprises a declarative validator 1308 that facilitates employing declarative rules to validate a message and a validation handler component 1310 that can comprise a predefined library of validation routines, which can be called and/or performed on messages and/or portions thereof being translated by the integration engine 1304. The integration engine 1304 further comprises a parser/serializer component 1312 and an ambiguity resolution component 1314, as described with respect to the preceding figures. Finally, a schema compiler 1316 is operatively coupled to the integration engine 1304.

The schema compiler 1316 can translate semantics-laden VAX schemas into a compact grammar that can be utilized during document translation (e.g., flat-file to XML and/or vice versa). Grammar generated by the schema compiler 1316 can facilitate managing myriad potential combinatorial arrangements that can arise from the optionality of numerous data fields and/or sub-fields (e.g., components, sub-components, . . . ). A memory footprint for the schema compiler 1316 is kept small, and facilitates simultaneous processing of documents belonging to hundreds of different schemas by the system 1300. Moreover, grammar generated by the V is highly adaptive and can demonstrate polymorphic behavior at run time. The behavior of the grammar can adapt consonantly with multiple document instances, which can comprise varied delimiters and/or degrees of delimiter optionality.

At run time, a VAX can be compiled by the schema compiler 1316 into a compact object model, or translation specification. Once compiled, the VAX is no longer required for translation, and the integration engine 1304 can utilize the translation specification for document translation. Each schema (e.g., VAX) can be represented as a collection of segment objects along with grouping information that applies to one or more of the segments. In this manner, a single HL7 segment can be represented in multiple schemas. The integration engine 1304 can reuse segment definitions in all schemas comprising the segment to facilitate reducing compiling time and improving system memory usage. During compilation, information can be derived from schema nodes and caches so that it can be accessed at run time. Such nodal informational can comprise without being limited to, for example, child spatial position and/or follow sets associated with the node.

A VAX can have one or more optional nodes. From each descendant of a segment node, three properties can be extracted at run time. For instance, determinations can be made regarding whether a node is a first child of its parent, whether it is a last child of its parent, and/or whether a valid document instance can contain the child node as a last node of the given segment. The following pseudo-code represents an example of an EVN (event) segment of a VAX that can be compiled:

SegmentID (x, TagId=y) min=a, max=b FCL
x—depth of the node
y—Tag identifier of the node
a—minOccurs
b—maxOccurs
F—set to F if this is the 1ct child, otherwise 0
C—set to C if this could be the last child in a valid document instance, otherwise 0
L—set to L if this is the last child, otherwise 0
EVN(1, TagId=EVN) min=1 max=1 F00
EVN.1(2) min=0 max=1 F00
EVN.2(2) min=1 max=1 0C0
EVN.3(2) min=0 max=1 0C0
EVN.4(2) min=0 max=1 0C0
EVN.5(2) min=0 max=-1 0C0
EVN.6(2) min=0 max=1 0CL It can be observed that the field "EVN.2" is not a last child of the EVN segment parent node. However, a valid instance of a document can comprise data only for EVN.1 and EVN.2 since all other sibling nodes thereof are optional. Similar logic can be applied to EVN.3-EVN.6, where EVN.6 is the last child, in addition to being a node marking the end of data for the segment.

A follow set employed by the schema compiler 1316 can comprise the set of all possible delimiters with which data for a given node can end. The follow set can comprise information related to various logical delimiters, and actual values of the delimiters can be substituted at run time. In this manner, the schema compiler 1316 can utilize a single translation specification across a plurality of document instances. The translation specification can be generated to comprise read-only information, and different consumers (e.g., applications, . . . ) can simultaneously employ a single specification. Information related to determining a data quantity to be produced, resolving ambiguity, etc., can reside in a run time context object such that each consuming application can have its own private instance of the context object. In this manner, the system 1300 can provide an efficient and scalable integration engine architecture.

For example, a "PID" (patient identification) segment, such as is described supra with regard to FIG. 5, can be a relatively complex segment that comprises repeatable and non-repeatable fields, components, and/or sub-components. The compiled grammar associated with the tree-view of the PID segment depicted in FIG. 5 contains information related to one or more follow sets, the formatting convention for which is presented below:

n|^~& with n—set to n if data for a node can end with segment delimiter

|—set to | when data for a node can end with field delimiter

^—set to ^ when data for a node can end with component delimiter

~—set to ~ when data for a node can end with repetition delimiter

&—set to & when data for a node can end with sub-component delimiter

The compiled grammar for the PID segment of FIG. 5 is presented below to facilitate understanding of the manner in which the schema compiler 1316 can represent a VAX with follow set information as a translation specification for use at run time:

```
PID(1,TagId=PID) min=1 max=1 000 followSet=n0000
    PID.1(2) min=0 max=1 F00 followSet=0|000
    PID.2(2) min=0 max=1 000 followSet=0|000
        CX.0(3) min=0 max=1 FC0 followSet=0|^00
        CX.1(3) min=0 max=1 0C0 followSet=0|^00
        CX.2(3) min=0 max=1 0C0 followSet=0|^00
        CX.3(3) min=0 max=1 0C0 followSet=0|^00
            CX.3.0(4) min=0 max=1 FC0 followSet=0|^0&
            CX.3.1(4) min=0 max=1 0C0 followSet=0|^0&
            CX.3.2(4) min=0 max=1 0CL followSet=0|^00
        CX.4(3) min=0 max=1 0C0 followSet=0|^00
        CX.5(3) min=0 max=1 0CL followSet=0|000
            CX.5.0(4) min=0 max=1 FC0 followSet=0|00&
            CX.5.1(4) min=0 max=1 0C0 followSet=0|00&
            CX.5.2(4) min=0 max=1 0CL followSet=0|000
    PID.3(2) min=1 max=-1 000 followSet=0|0~0
        CX.0(3) min=0 max=1 FC0 followSet=0|^~0
        CX.1(3) min=0 max=1 0C0 followSet=0|^~0
        CX.2(3) min=0 max=1 0C0 followSet=0|^~0
        CX.3(3) min=0 max=1 0C0 followSet=0|^~0
            CX.3.0(4) min=0 max=1 FC0 followSet=0|^~&
            CX.3.1(4) min=0 max=1 0C0 followSet=0|^~&
            CX.3.2(4) min=0 max=1 0CL followSet=0|^~0
        CX.4(3) min=0 max=1 0C0 followSet=0|^~0
        CX.5(3) min=0 max=1 0CL followSet=0|0~0
            CX.5.0(4) min=0 max=1 FC0 followSet=0|0~&
            CX.5.1(4) min=0 max=1 0C0 followSet=0|0~&
            CX.5.2(4) min=0 max=1 0CL followSet=0|0~0
    PID.4(2) min=-1 max=-1 000 followSet=0|0~0
        CX.0(3) min=0 max=1 FC0 followSet=0|^~0
        CX.1(3) min=0 max=1 0C0 followSet=0|^~0
        CX.2(3) min=0 max=1 0C0 followSet=0|^~0
        CX.3(3) min=0 max=1 0C0 followSet=0|^~0
            CX.3.0(4) min=0 max=1 FC0 followSet=0|^~&
            CX.3.1(4) min=0 max=1 0C0 followSet=0|^~&
            CX.3.2(4) min=0 max=1 0CL followSet=0|^~0
        CX.4(3) min=0 max=1 0C0 followSet=0|^~0
        CX.5(3) min=0 max=1 0CL followSet=0|0~0
            CX.5.0(4) min=0 max=1 FC0 followSet=0|0~&
            CX.5.1(4) min=0 max=1 0C0 followSet=0|0~&
            CX.5.2(4) min=0 max=1 0CL followSet=0|0~0
    PID.5(2) min=1 max=-1 0C0 followSet=n|0~0
        XPN.0(3) min=0 max=1 FC0 followSet=n|^~0
            XPN.0.0(4) min=0 max=1 FC0 followSet=n|^~&
            XPN.0.1(4) min=0 max=1 0CL followSet=n|^~0
        XPN.1(3) min=0 max=1 0C0 followSet=n|^~0
        XPN.2(3) min=0 max=1 0C0 followSet=n|^~0
        XPN.3(3) min=0 max=1 0C0 followSet=n|^~0
        XPN.4(3) min=0 max=1 0C0 followSet=n|^~0
        XPN.5(3) min=0 max=1 0C0 followSet=n|^~0
        XPN.6(3) min=0 max=1 0C0 followSet=n|^~0
        XPN.7(3) min=0 max=1 0CL followSet=n|0~0
    PID.6(2) min=0 max=-1 0C0 followSet=n|0~0
        XPN.0(3) min=0 max=1 FC0 followSet=n|^~0
            XPN.0.0(4) min=0 max=1 FC0 followSet=n|^~&
            XPN.0.1(4) min=0 max=1 0CL followSet=n|^~0
        XPN.1(3) min=0 max=1 0C0 followSet=n|^~0
        XPN.2(3) min=0 max=1 0C0 followSet=n|^~0
        XPN.3(3) min=0 max=1 0C0 followSet=n|^~0
        XPN.4(3) min=0 max=1 0C0 followSet=n|^~0
        XPN.5(3) min=0 max=1 0C0 followSet=n|^~0
        XPN.6(3) min=0 max=1 0C0 followSet=n|^~0
        XPN.7(3) min=0 max=1 0CL followSet=n|0~0
```

-continued

```
PID.7(2) min=0 max=1 0C0 followSet=n|000
PID.8(2) min=0 max=1 0C0 followSet=n|000
PID.9(2) min=0 max=-1 0C0 followSet=n|0~0
    XPN.0(3) min=0 max=1 FC0 followSet=n|^~0
        XPN.0.0(4) min=0 max=1 FC0 followSet=n|^~&
        XPN.0.1(4) min=0 max=1 0CL followSet=n|^~0
    XPN.1(3) min=0 max=1 0C0 followSet=n|^~0
    XPN.2(3) min=0 max=1 0C0 followSet=n|^~0
    XPN.3(3) min=0 max=1 0C0 followSet=n|^~0
    XPN.4(3) min=0 max=1 0C0 followSet=n|^~0
    XPN.5(3) min=0 max=1 0C0 followSet=n|^~0
    XPN.6(3) min=0 max=1 0C0 followSet=n|^~0
    XPN.7(3) min=0 max=1 0CL followSet=n|0~0
PID.10(2) min=0 max=-1 0C0 followSet=n|0~0
    CE_0005.0(3) min=0 max=1 FC0 followSet=n|^~0
    CE_0005.1(3) min=0 max=1 0C0 followSet=n|^~0
    CE_0005.2(3) min=0 max=1 0C0 followSet=n|^~0
    CE_0005.3(3) min=0 max=1 0C0 followSet=n|^~0
    CE_0005.4(3) min=0 max=1 0C0 followSet=n|^~0
    CE_0005.5(3) min=0 max=1 0CL followSet=n|0~0
PID.11(2) min=0 max=-1 0C0 followSet=n|0~0
    XAD.0(3) min=0 max=1 FC0 followSet=n|^~0
    XAD.1(3) min=0 max=1 0C0 followSet=n|^~0
    XAD.2(3) min=0 max=1 0C0 followSet=n|^~0
    XAD.3(3) min=0 max=1 0C0 followSet=n|^~0
    XAD.4(3) min=0 max=1 0C0 followSet=n|^~0
    XAD.5(3) min=0 max=1 0C0 followSet=n|^~0
    XAD.6(3) min=0 max=1 0C0 followSet=n|^~0
    XAD.7(3) min=0 max=1 0C0 followSet=n|^~0
    XAD.8(3) min=0 max=1 0C0 followSet=n|^~0
    XAD.9(3) min=0 max=1 0C0 followSet=n|^~0
    XAD.10(3) min=0 max=1 0CL followSet=n|0~0
PID.12(2) min=0 max=1 0C0 followSet=n|000
PID.13(2) min=0 max=-1 0C0 followSet=n|0~0
    XTN.0(3) min=0 max=1 FC0 followSet=n|^~0
    XTN.1(3) min=0 max=1 0C0 followSet=n|^~0
    XTN.2(3) min=0 max=1 0C0 followSet=n|^~0
    XTN.3(3) min=0 max=1 0C0 followSet=n|^~0
    XTN.4(3) min=0 max=1 0C0 followSet=n|^~0
    XTN.5(3) min=0 max=1 0C0 followSet=n|^~0
    XTN.6(3) min=0 max=1 0C0 followSet=n|^~0
    XTN.7(3) min=0 max=1 0C0 followSet=n|^~0
    XTN.8(3) min=0 max=1 0CL followSet=n|0~0
PID.14(2) min=0 max=-1 0C0 followSet=n|0~0
    XTN.0(3) min=0 max=1 FC0 followSet=n|^~0
    XTN.1(3) min=0 max=1 0C0 followSet=n|^~0
    XTN.2(3) min=0 max=1 0C0 followSet=n|^~0
    XTN.3(3) min=0 max=1 0C0 followSet=n|^~0
    XTN.4(3) min=0 max=1 0C0 followSet=n|^~0
    XTN.5(3) min=0 max=1 0C0 followSet=n|^~0
    XTN.6(3) min=0 max=1 0C0 followSet=n|^~0
    XTN.7(3) min=0 max=1 0C0 followSet=n|^~0
    XTN.8(3) min=0 max=1 0CL followSet=n|0~0
PID.15(2) min=0 max=1 0C0 followSet=n|000
    CE_0296.0(3) min=0 max=1 FC0 followSet=n|^00
    CE_0296.1(3) min=0 max=1 0C0 followSet=n|^00
    CE_0296.2(3) min=0 max=1 0C0 followSet=n|^00
    CE_0296.3(3) min=0 max=1 0C0 followSet=n|^00
    CE_0296.4(3) min=0 max=1 0C0 followSet=n|^00
    CE_0296.5(3) min=0 max=1 0CL followSet=n|000
PID.16(2) min=0 max=1 0C0 followSet=n|000
    CE_0002.0(3) min=0 max=1 FC0 followSet=n|^00
    CE_0002.1(3) min=0 max=1 0C0 followSet=n|^00
    CE_0002.2(3) min=0 max=1 0C0 followSet=n|^00
    CE_0002.3(3) min=0 max=1 0C0 followSet=n|^00
    CE_0002.4(3) min=0 max=1 0C0 followSet=n|^00
    CE_0002.5(3) min=0 max=1 0CL followSet=n|000
PID.17(2) min=0 max=1 0C0 followSet=n|000
    CE_0006.0(3) min=0 max=1 FC0 followSet=n|^00
    CE_0006.1(3) min=0 max=1 0C0 followSet=n|^00
    CE_0006.2(3) min=0 max=1 0C0 followSet=n|^00
    CE_0006.3(3) min=0 max=1 0C0 followSet=n|^00
    CE_0006.4(3) min=0 max=1 0C0 followSet=n|^00
    CE_0006.5(3) min=0 max=1 0CL followSet=n|000
PID.18(2) min=0 max=1 0C0 followSet=n|000
    CX.0(3) min=0 max=1 FC0 followSet=n|^00
    CX.1(3) min=0 max=1 0C0 followSet=n|^00
    CX.2(3) min=0 max=1 0C0 followSet=n|^00
    CX.3(3) min=0 max=1 0C0 followSet=n|^00
        CX.3.0(4) min=0 max=1 FC0 followSet=n|^0&
        CX.3.1(4) min=0 max=1 0C0 followSet=n|^0&
        CX.3.2(4) min=0 max=1 0CL followSet=n|^00
    CX.4(3) min=0 max=1 0C0 followSet=n|^00
    CX.5(3) min=0 max=1 0CL followSet=n|000
        CX.5.0(4) min=0 max=1 FC0 followSet=n|00&
        CX.5.1(4) min=0 max=1 0C0 followSet=n|00&
        CX.5.2(4) min=0 max=1 0CL followSet=n|000
PID.19(2) min=0 max=1 0C0 followSet=n|000
PID.20(2) min=0 max=1 0C0 followSet=n|000
    DLN.0(3) min=0 max=1 FC0 followSet=n|^00
    DLN.1(3) min=0 max=1 0C0 followSet=n|^00
    DLN.2(3) min=0 max=1 0CL followSet=n|000
PID.21(2) min=0 max=-1 0C0 followSet=n|0~0
    CX.0(3) min=0 max=1 FC0 followSet=n|^~0
    CX.1(3) min=0 max=1 0C0 followSet=n|^~0
    CX.2(3) min=0 max=1 0C0 followSet=n|^~0
    CX.3(3) min=0 max=1 0C0 followSet=n|^~0
        CX.3.0(4) min=0 max=1 FC0 followSet=n|^~&
        CX.3.1(4) min=0 max=1 0C0 followSet=n|^~&
        CX.3.2(4) min=0 max=1 0CL followSet=n|^~0
    CX.4(3) min=0 max=1 0C0 followSet=n|^~0
    CX.5(3) min=0 max=1 0CL followSet=n|0~0
        CX.5.0(4) min=0 max=1 FC0 followSet=n|0~&
        CX.5.1(4) min=0 max=1 0C0 followSet=n|0~&
        CX.5.2(4) min=0 max=1 0CL followSet=n|0~0
PID.22(2) min=0 max=-1 0C0 followSet=n|0~0
    CE_0189.0(3) min=0 max=1 FC0 followSet=n|^~0
    CE_0189.1(3) min=0 max=1 0C0 followSet=n|^~0
    CE_0189.2(3) min=0 max=1 0C0 followSet=n|^~0
    CE_0189.3(3) min=0 max=1 0C0 followSet=n|^~0
    CE_0189.4(3) min=0 max=1 0C0 followSet=n|^~0
    CE_0189.5(3) min=0 max=1 0CL followSet=n|0~0
PID.23(2) min=0 max=1 0C0 followSet=n|000
PID.24(2) min=0 max=1 0C0 followSet=n|000
PID.25(2) min=0 max=1 0C0 followSet=n|000
PID.26(2) min=0 max=-1 0C0 followSet=n|0~0
    CE_0171.0(3) min=0 max=1 FC0 followSet=n|^~0
    CE_0171.1(3) min=0 max=1 0C0 followSet=n|^~0
    CE_0171.2(3) min=0 max=1 0C0 followSet=n|^~0
    CE_0171.3(3) min=0 max=1 0C0 followSet=n|^~0
    CE_0171.4(3) min=0 max=1 0C0 followSet=n|^~0
    CE_0171.5(3) min=0 max=1 0CL followSet=n|0~0
PID.27(2) min=0 max=1 0C0 followSet=n|000
    CE_0172.0(3) min=0 max=1 FC0 followSet=n|^00
    CE_0172.1(3) min=0 max=1 0C0 followSet=n|^00
    CE_0172.2(3) min=0 max=1 0C0 followSet=n|^00
    CE_0172.3(3) min=0 max=1 0C0 followSet=n|^00
    CE_0172.4(3) min=0 max=1 0C0 followSet=n|^00
    CE_0172.5(3) min=0 max=1 0CL followSet=n|000
PID.28(2) min=0 max=1 0C0 followSet=n|000
    CE_0212.0(3) min=0 max=1 FC0 followSet=n|^00
    CE_0212.1(3) min=0 max=1 0C0 followSet=n|^00
    CE_0212.2(3) min=0 max=1 0C0 followSet=n|^00
    CE_0212.3(3) min=0 max=1 0C0 followSet=n|^00
    CE_0212.4(3) min=0 max=1 0C0 followSet=n|^00
    CE_0212.5(3) min=0 max=1 0CL followSet=n|000
PID.29(2) min=0 max=1 0C0 followSet=n|000
PID.30(2) min=0 max=1 0CL followSet=n0000
```

It can be noted from the above compiled grammar example that PID.2 has followSet=0|000, indicating that data associated with this node can only end with a field delimiter ("|"). PID.23 has followSet=n|000, which indicates that data associated with PID.23 can end with a field delimiter or a segment delimiter. This is so because PID.23 can be a last child node (e.g., all siblings thereof are optional). Thus, if siblings are present, PID.23 can be delimited as a field, while it can be delimited as a segment in the absence of sibling nodes.

PID.21 has followSet=n|0~0, indicating that data associated therewith can end with a repetition delimiter. CX.3 has followSet=n|^~0, which indicates that data associated therewith can end with a component delimiter and/or a repetition delimiter, since CX.3 can be the last component (e.g., child) of its parent node, PID.21. It will further be noted that CX.3.0 has followSet=n|^~&, indicating that data associated therewith can end with any possible delimiter because it is a sub-component (e.g., of the CX.3 component node). It is to be appreciated that in instances where the sub-component delimiter ("&") is not defined, the integration engine 1304 will only consider the remaining four delimiters.

For example, if data associated with the CX.3 node is "abc&def" in two instances, wherein the first instance defines "&" as a sub-component delimiter and the second instance does not define a sub-component delimiter, the following XML snippets could result.

First instance: sub-component delimiter defined:

```
<CX.3>
    <CX.3.0>abc</CX.3.0>
    <CX.3.1>def</CX.3.1>
</CX.3>
```

Second instance: sub-component delimiter not defined:

```
<CX.3>
    <CX.3.0>abc&def</CX.3.0>
</CX.3>
```

The PID segment has thirty child nodes (e.g., PID.1-PID.30). It will be noted however that a valid document need not contain all thirty nodes: rather, a valid document can end with PID.5 because PID.5 is the first child node that could be a last child of a valid instance. When the parser/serializer component 1312 parses a document, a single segment representation can manage the optionality of all fields therein. In this manner, the schema compiler 1316 can generate grammar that handles all cases of like data until PID.5 data is present, until PID.6 data is present, and so on until PID.30 data is present, such that separate grammar productions for each occurrence of each specific number of fields need not be generated (e.g., the schema compiler need not generate thirty different grammar productions, . . . ). Rather, the parser/serializer component 1312 can retain information related to data location and/or position, segment position, etc., as it scans the input document. In this manner the schema compiler 1316 can generate a compiled segment that is compact, adaptive, completely resident in memory, and that can manage productions such as, for example:

PID->PID.1 PID.2 PID.3 PID.4 PID.5
➔PID.1 PID.2 PID.3 PID.4 PID.5 PID.6
➔PID.1 PID.2 PID.3 PID.4 PID.5 PID.6 PID.7
➔PID.1 PID.2 PID.3 PID.4 PID.5 PID.6 PID.7 . . . PID.30

Figure 14:
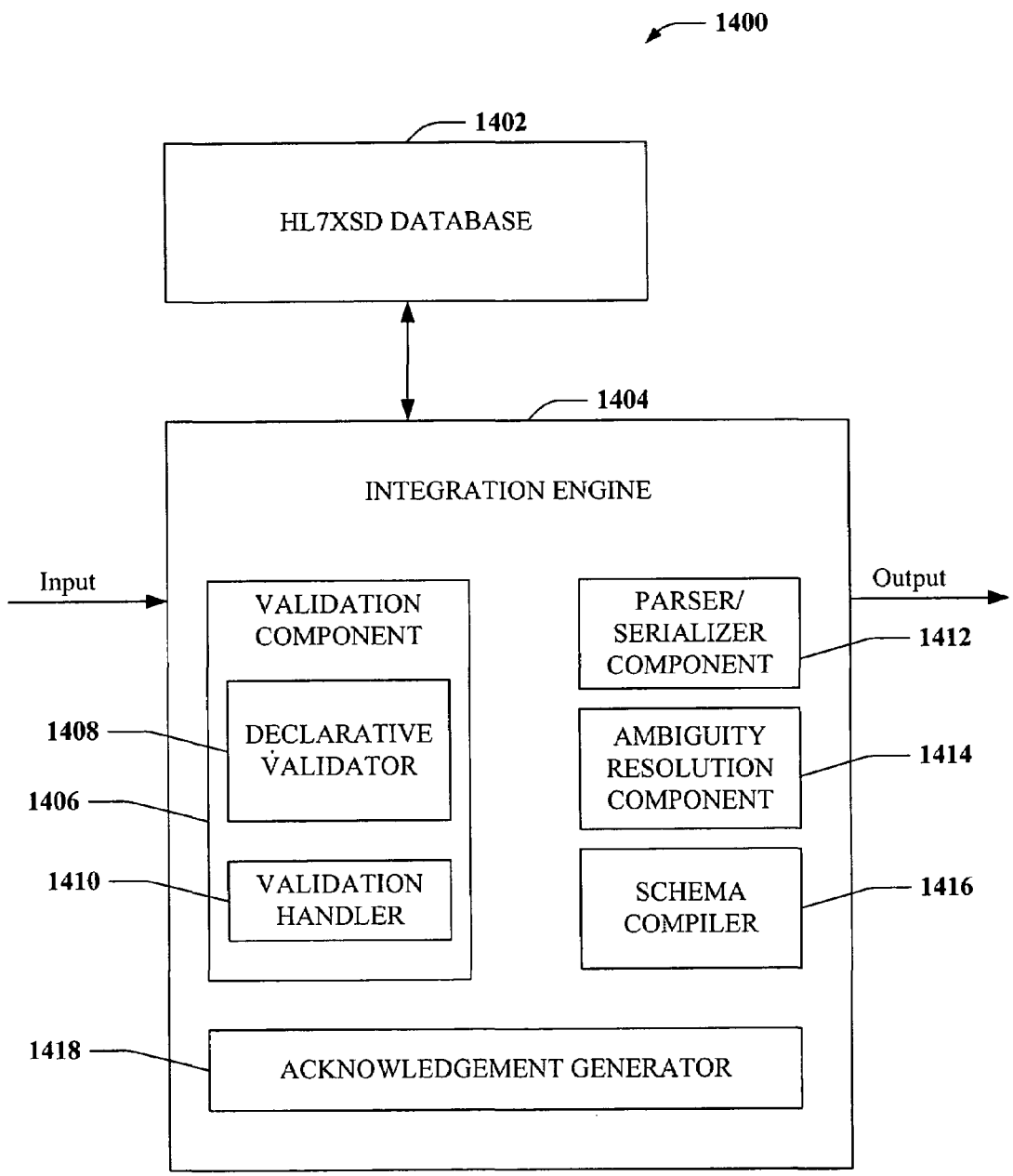
FIG. 14 is an illustration of a system 1400 that facilitates providing single pass translation and validation of a flat-file document as well as synchronous generation of acknowledgements, in accordance with an aspect of the subject invention.

FIG. 14 is an illustration of a system 1400 that facilitates providing single pass translation and validation of a flat-file document as well as synchronous generation of acknowledgements, in accordance with an aspect of the subject invention. The system 1400 comprises a VAX database 1402 that stores VAXs associated with messages that can be received as input by an integration engine 1404. The integration engine 1404 comprises a validation component 1406 similar to the validation component described with regard to FIGS. 8 and 9, which in turn comprises a declarative validator 1408 and a validation handler component 1410. The integration engine 1404 further comprises a parser/serializer component 1412, an ambiguity resolution component 1414, and a schema compiler 1416. The integration engine still further comprises an acknowledgement generator 1418 that provides synchronous generation of acknowledgements between source and destination applications.

Flat file documents, such as HL7 messages, are typically transported over connection-oriented protocols, such as TCP/IP, HTTP, and the like. Acknowledgements and/or other types of loop-back messages can be employed to ensure reliability with regard to message transfer and/or data content. Traditionally, with regard to HL7 message transmission, input messages are stored in a persistent database and acknowledged upon successful transmission. Subsequently, the message body is validated and data content-level acknowledgements are transmitted over a separate socket connection. Such dual acknowledgments can result in status mismatches caused by acceptance of a first acknowledgement message and rejection of the second acknowledgement message, which further decreases system efficiency.

The integration engine 1404 can synchronously receive a document, translate the document via the parser/serializer component 1412 in conjunction with a VAX for the document, resolve ambiguities that might arise during translation between flat-file and XML formats, compile a schema for the document, perform complete message content validation, and generate an acknowledgement and deliver it over the same socket connection over which original document was received. Additionally, depending on business needs, the integration engine 1404 can comprise the configuration flexibility to return selective acknowledgments over a same or different connection. Furthermore, acknowledgements can be routed based on information carried in message header. The engine 1404 can perform a single-pass scan of the header to extract sufficient information for routing an acknowledgement.

Figure 15:
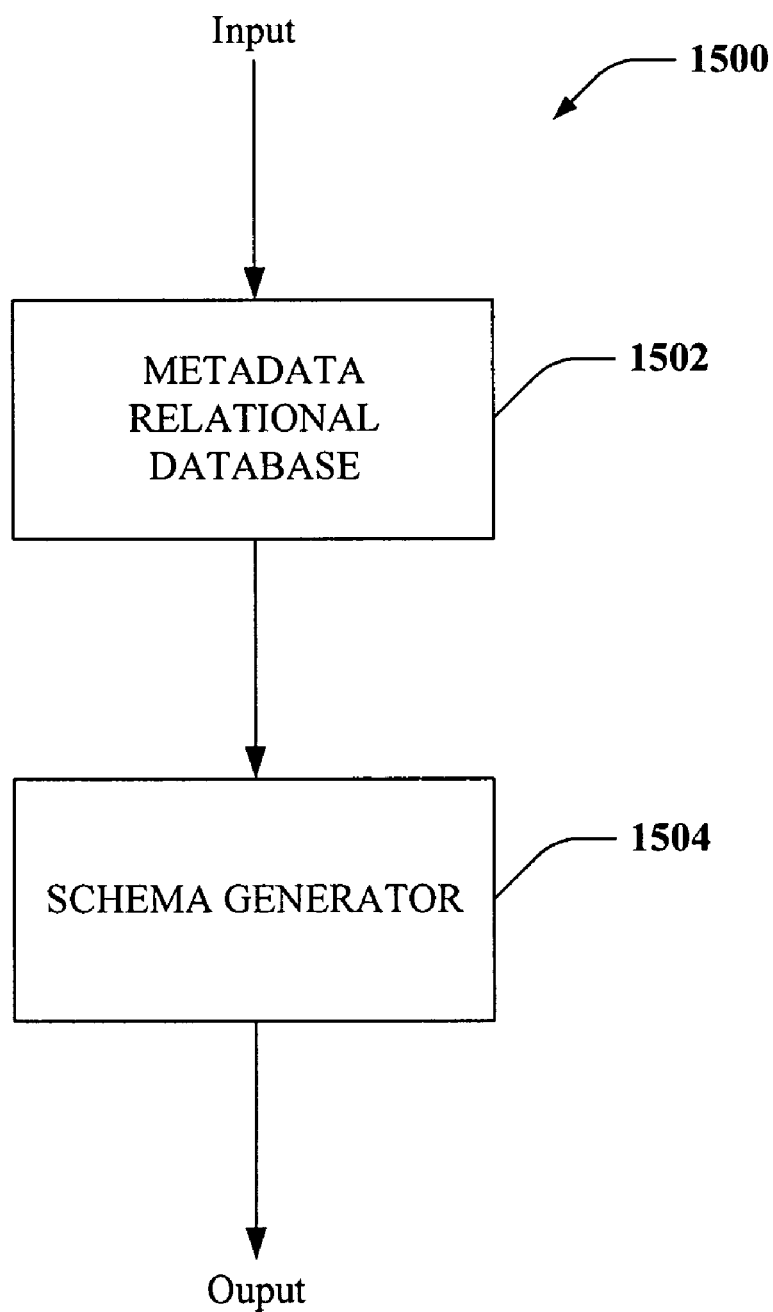
FIG. 15 illustrates a system 1500 that facilitates generating value-added XML schema from flat-file delimited data stored in a relational database in accordance with an aspect of the subject invention.

FIG. 15 is an illustration if a system 1500 that facilitates generating value-added XML schema from flat-file delimited data stored in a relational database in accordance with an aspect of the subject invention. Input can be received and/or stored by a metadata relational database 1502 that is operatively coupled to a schema generator 1504. The schema generator 1504 described herein can be part of the integration engine detailed above with regard to FIGS. 7-14, and/or can comprise components thereof. The relational database 1502 can comprise a set of data items organized as formally described tables. Data items can be reorganized, accessed, reassembled, and the like in myriad ways without reorganization of the tables themselves. Tables in the database 1502 can contain one or more data categories, usually in columns. Rows in the database 1502 can comprise unique instances of data for the categories defined in the respective columns. Columns in the database 1502 can be associated with predefined domains that delineate possible values that can reside in a data column. Additionally, constraints can be assigned to data values and/or domains comprising such data values. A table of metadata can be generated that comprises formal descriptions of tables, columns, rows, domains, and constraints associated with the database 1502. Relational databases are easily extensible, and information categories can be added to extant relational databases without requiring modification to applications that employ such databases.

Input messages can be formatted as, for example, external data representations (XDRs), data type definitions (DTDs), native XML schema definitions (XSDs), and the like. Messages stored in the relational database 1502 can comprise, for instance, a header portion that defines delimiters employed to facilitate parsing the flat-file data, and a body portion that comprises information represented as flat-file data. The schema generator 1504 can parse the native XSD (and/or other input type), generate two groups of schemas (e.g., metadata schemas and business rule schemas) based on the native file (typically in an HL7-ER7 format), link the two schemas together, and add annotations to generate a value-added XSD (VAX), which can then be output and stored to facilitate global modification of metadata and/or generation of multiple versions of messages. When parsing a message, the schema generator can parse a header therefore and can configure itself with the values of delimiters that need to be used to further parse the document structure. However, the delimiter information need not be present in the schemas.

Based on information contained in the flat-file message, the schema generator 1504 can construct two sets of schemas. A first set of schemas can represent encoding rules as metadata schemas, which can comprise representations of segments, data fields, data types (e.g., fields, components, subcomponents . . . ), and the like. A second group of schemas can represent business rules associated with the message. Business rules define trigger events associated with the message. For example, a trigger event can be an admissions message, a doctor referral, a message regarding a transfer between wards, a message related to discharge of a patient, etc. Each trigger event can be described by a schema: for instance, the exemplary schema "O01_231_GLO_DEF.xsd" can require that "Segment_231.xsd" be imported, along with "Fields_231.xsd" and "Tables_231.xsd." A business rule schema can additionally comprise a list of segments and/or groups that are associated with a specific trigger event. A single VAX can then be generated that comprises both the business rules and the metadata schemas, such that each VAX is associated with a particular message type.

According to an aspect of the invention, the schema generator 1504 can analyze both a translation specification and a transformation specification for a message and can convert the message simultaneously into a plurality of messages suitable for delivery to different destination applications. This aspect facilitates generation of VAXs in an extensible manner that allows versioning information to be stored, which is desirable when integrating different business applications that use variants of the same schema. Thus, multiple versions of a single segment can be stored such that a first application can utilize a first version and a second application can utilize a second version, etc. Changes made to a particular segment, field, component, sub-component, etc., can be immediately reflected in all schemas that consume the particular segment, field, component, sub-component, etc. Additionally, during message translation, messages can undergo a comprehensive validation process that can detect errors therein. Errors can be corrected using data manipulation technology, such as an XML document/form editor and the like. For instance, different versions of forms can be generated for each schema by the schema generator 1504.

Figure 16:
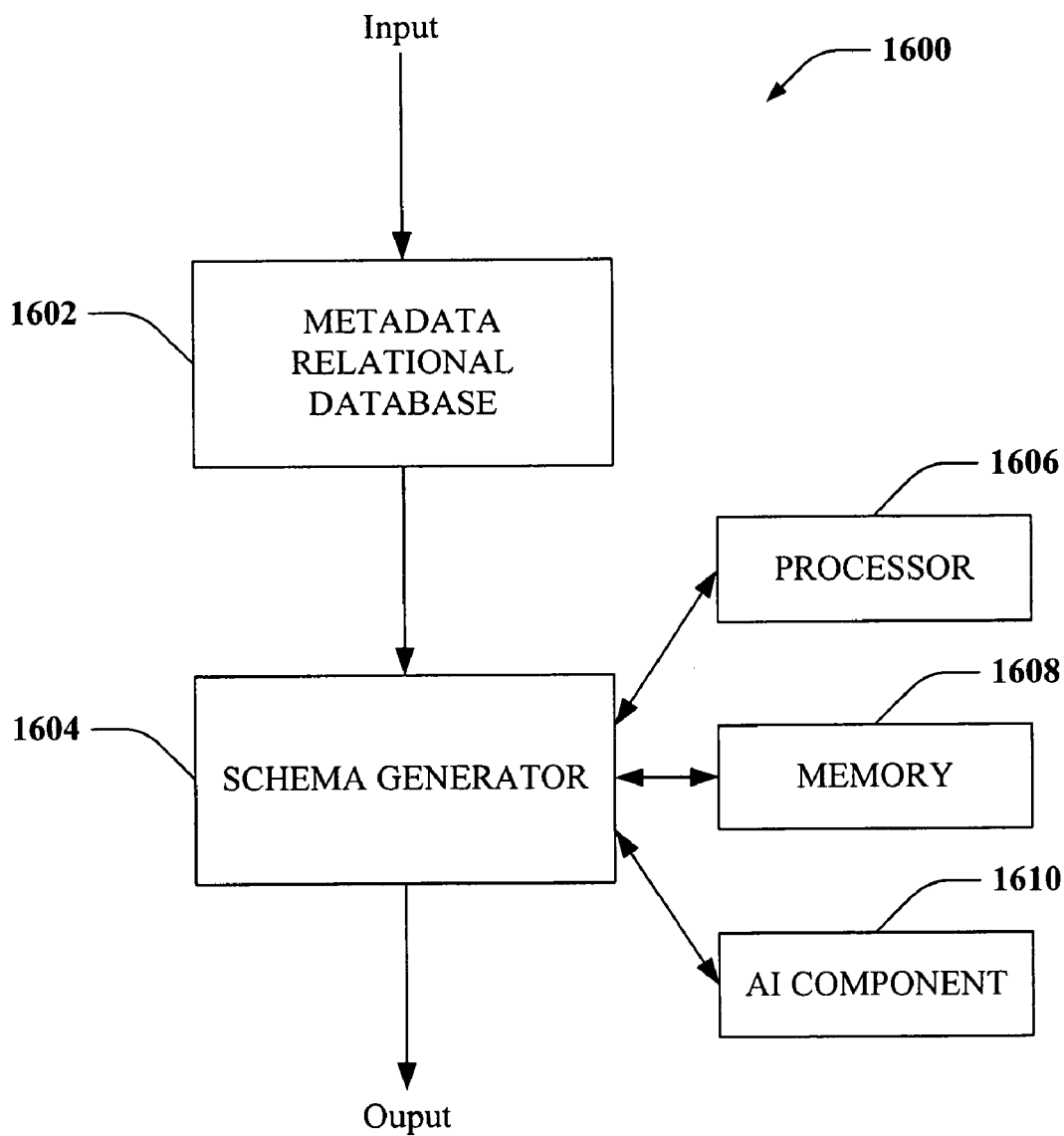
FIG. 16 is an illustration of a system 1600 that facilitates VAX generation in accordance with an aspect of the subject invention.

Referring now to FIG. 16, there is illustrated a system 1600 that facilitates VAX generation in accordance with an aspect of the subject invention. The system 1600 comprises a metadata relational database 1602 and a schema generator 1604 as discussed with regard to FIG. 15. The metadata relational database 1602 can receive and store information such as a native XSD, delimited flat-file, etc. The schema generator 1604 can parse segments of the native XSD in order to generate a VAX that represents information from the native XSD as well as information related to validation logic and/or business rules employed to destination-specific versions of the XSD message. Such VAXs can be associated with trigger events (e.g., included in the business rules, annotations, etc.) that dictate when a particular version of a message is to be transmitted to its target destination. Additionally, VAXs can be associated with sub-library schemas that comprise information related to encoding rules for the XML message.

The schema generator 1604 can be further operatively coupled to a processor 1606 that analyzes data received and/or or generated by the schema generator 1604, and a memory 1608 that stores information associated with system operations. It is to be appreciated that the processor 1606 can be a processor dedicated to analyzing information received by the schema generator, a processor that controls one or more components of the system 1600, and/or a processor that both analyzes information received by the schema generator 1604 and controls one or more components of the system 1600. Additionally, it is to be appreciated that the processor 1606 and memory 1608 can be operatively coupled to various other components of various other figures described herein, and are not limited to utilization solely in conjunction with schema generation.

The memory 1608 can additionally store protocols associated with generating VAXs from data stored in the relational database 1602, such that the system 1600 can employ stored protocols and/or algorithms to parse flat file XSD segments, to group segments contained in the flat-file XSD when generating VAXs, to permit changes to field, component, and/or subcomponent values in the VAXs, and the like. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1608 of the present systems and methods is intended to comprise, without being limited to, these and any other suitable types of memory.

The schema generator 1604 is further operatively coupled to an artificial intelligence (AI) component 1610 that can make inferences regarding operation of the system 1600. For example, the AI component 1610 can infer a proper parsing algorithm to be employed when grouping XSD segments to generate a VAX. Additionally and/or alternatively, the AI component 1610 can be employed to determine an appropriate grouping methodology (e.g., sequence, choice, . . . ) to utilize when grouping segments, groups of segments, and the like. Still furthermore, it is to be appreciated that the AI component 1610 can be operatively coupled to any of the components described herein with regard to the preceding figures, and can be employed to infer appropriate actions with regard to, for instance, schema compilation, ambiguity resolution, etc. The preceding examples are illustrative in nature, and are not intended to limit the scope of the manner in which the AI component 1610 makes inferences or the number of inferences that can be made by the AI component 1610.

With reference to FIGS. 17-20, there are illustrated flowcharts in accordance with various aspects of the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts can, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 17:
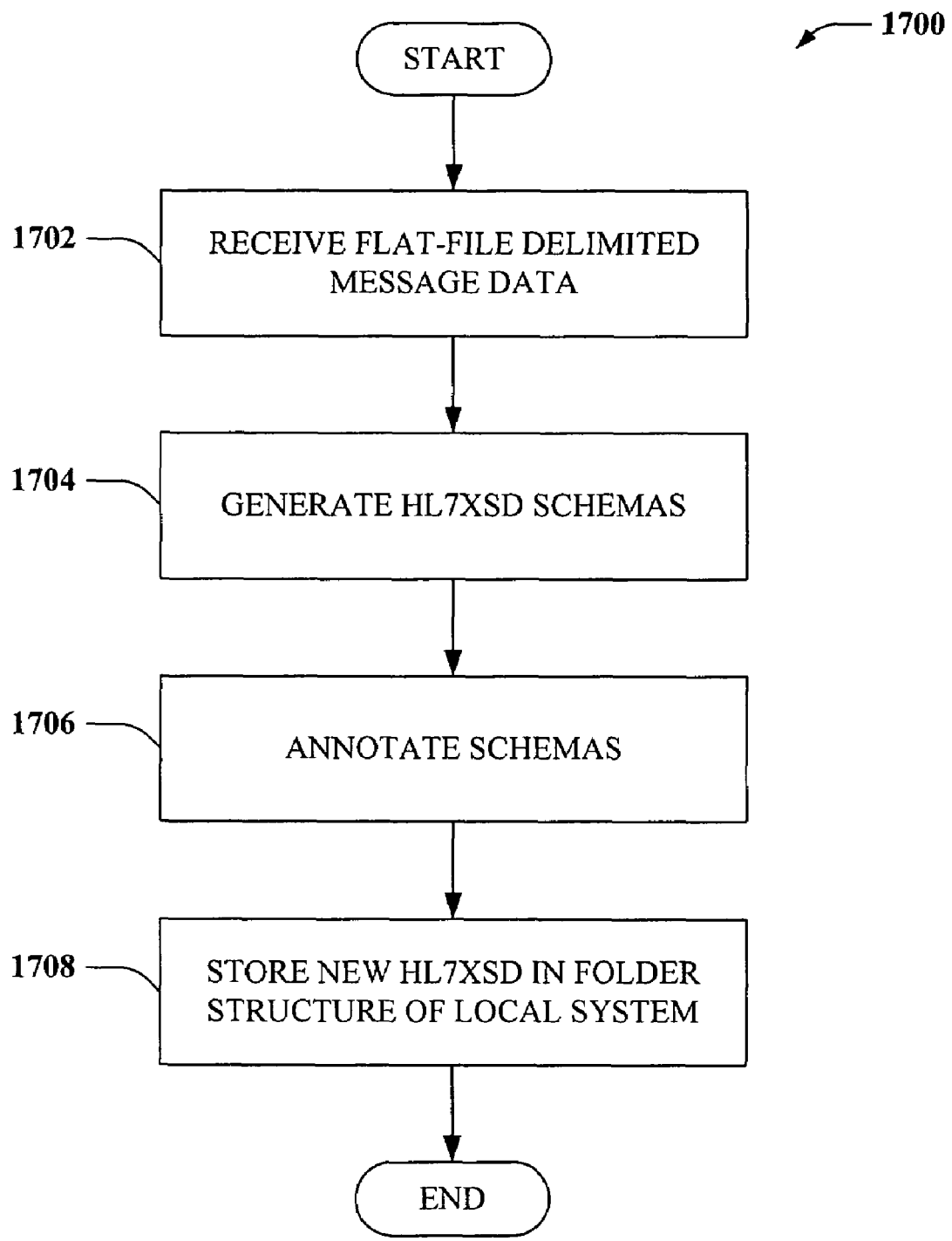
FIG. 17 illustrates a methodology 1700 for generating value-added XSDs in accordance with the subject invention.

Referring now to FIG. 17, there is illustrated a methodology 1700 for generating value-added XSDs in accordance with the subject invention. At 1702, flat-file delimited data, such as an HL7 document, can be received. Information contained in the flat-file message can be parsed according to delimiters defined in the message header and employed in the message body to separate message portions. Based on such delimiter information, at 1704, HL7XSD schemas can be generated, which can comprise a metadata schema that has information related to representations of segments, fields, components, and sub-components, as well as a business rule schema that comprises information related to predefined formatting rules for a specific business environment, such as a hospital. At 1706 the HL7XSD can be annotated using a stored template to generate a VAX. Annotations can provide information related to reorganization of delimited flat-file segments, fields, etc., groupings thereof (e.g., choice, sequence, . . . ), and the like. Once annotated, the HL7VAX can be stored in a created folder structure in a local file system at 1708. Fore example, the folder structures of FIGS. 3-5 can be representative of folder structure generated to store one or more VAXs.

Figure 18:
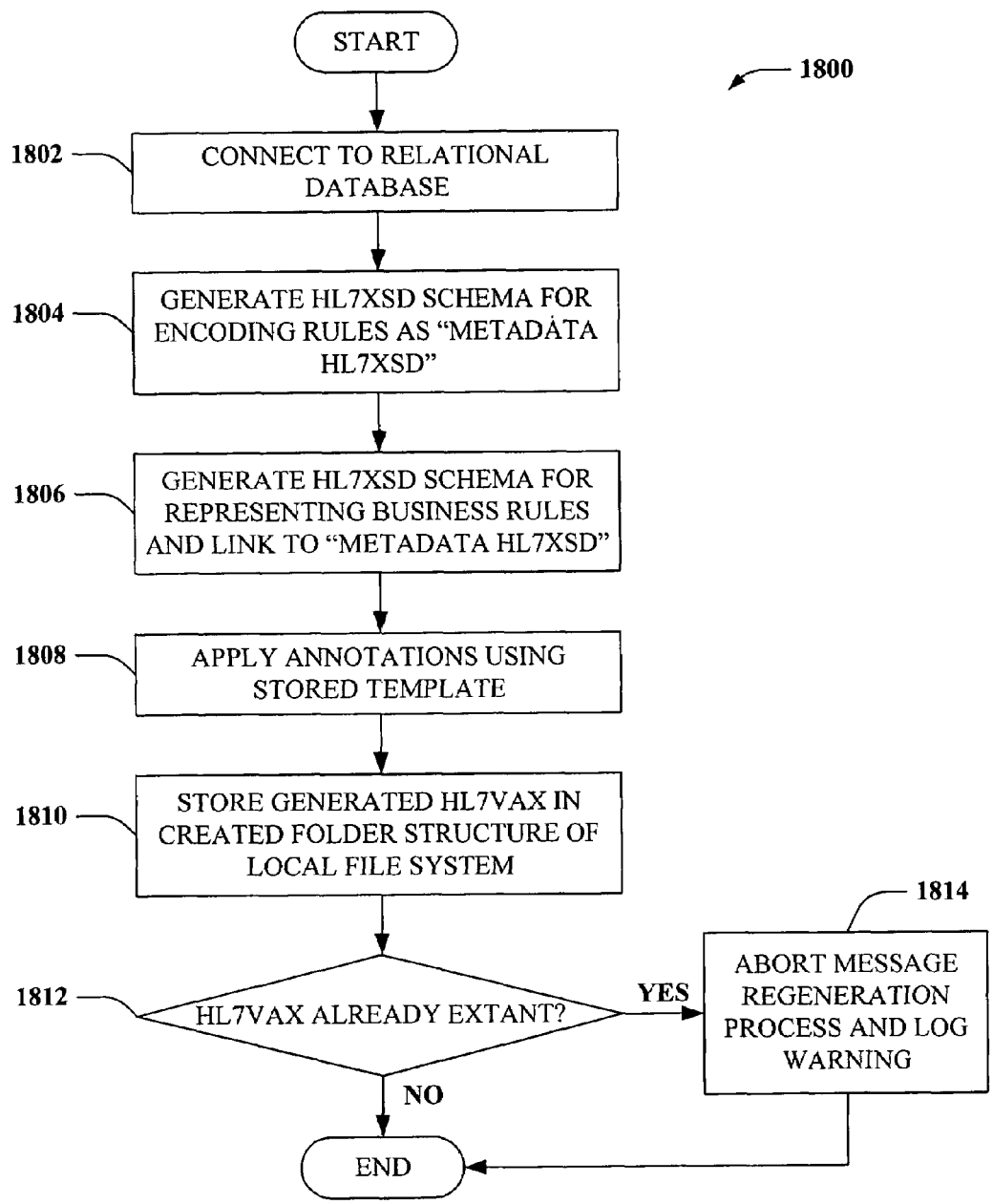
FIG. 18 is an illustration of a methodology 1800 for generating VAXs from flat-file delimited data in accordance with an aspect of the subject invention.

Referring now to FIG. 18, there is illustrated a methodology 1800 for generating VAXs from flat-file delimited data in accordance with an aspect of the subject invention. According to the methodology 1800, at 1802, a connection can be established with a relational database in which flat-file data and/or messages related thereto are stored. At 1804, a metadata XSD can be generated. The metadata XSD can comprise, for example, information related to segments and/or groups thereof in the flat-file message, data fields within segments, components within fields, sub-components of components, etc. At 1806, a business rule XSD can be generated and linked to the metadata XSD for the particular message and/or message type. Business rule information can comprise, for example, information that triggers events based on the message. For instance, a business rule can require an acknowledgement to be sent from an application that has received a message to an application that transmitted the message. At 1808, the combined business-rule-and-metadata XSD can be annotated using a stored template to created a value-added XSD. Annotations can include, for example, information related to VAX structure, business rules, groupings of segments, fields, etc., or any other suitable information that facilitates converting a message simultaneously into a plurality of messages suitable for delivery to a plurality of destinations. The VAX can then be stored in folder structure generated in a local file system at 1810. For example, a the tree-formatted folder structures of FIGS. 3-5 represent VAX storage structures that can be utilized to store the VAX generated at 1802-1810.

At 1812, a determination can be made regarding whether a VAX for the particular message and/or flat file data undergoing translation and transformation already exists. If it is determined that no such VAX already exists, the methodology can terminate. If it is determined that a VAX for the particular message type has already been created, then at 1814, message regeneration can be aborted and a warning can be logged. It is to be appreciated that checking for an extant VAX as described with regard to 1812 and 1814 can occur earlier in the methodology 1800 if desired, in order to mitigate unnecessary system resource consumption by generating a duplicate VAX.

Figure 19:
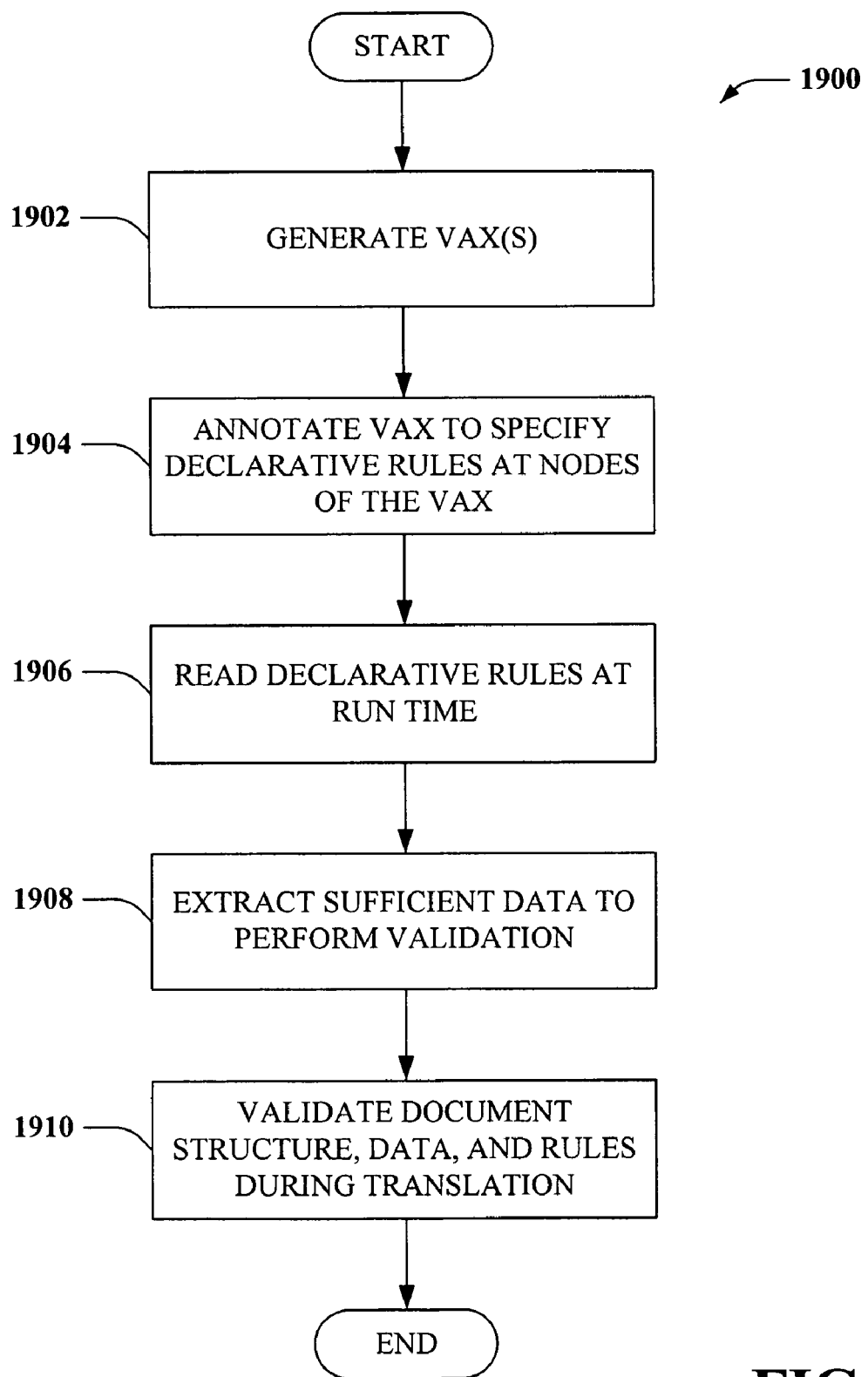
FIG. 19 is an illustration of a methodology 1900 for formally describing structured documents along with complex validation rules using value-added XSDs (VAXs), in accordance with an aspect of the subject invention.

FIG. 19 is an illustration of a methodology 1900 for formally describing structured documents along with complex validation rules using value-added XSDs (VAXs), in accordance with an aspect of the subject invention. At 1902, one or more VAXs can be generated, such as described with reference to the methodologies presented with regard to FIGS. 17 and 18. At 1904, declarative rules related to document validation can be specified at particular nodes in the VAX. Such declarative rule specification can be performed by annotating the VAX, as described with regard to FIG. 9, the description of which sets forth an example of pseudo-code for such an annotation. For instance, when the engine encounters an XSD annotation in the VAX such as "if exists (/Xpath1) then exists (/Xpath2), the engine can collect values associated with the data fields /Xpath1 and /Xpath2 into a data dictionary as data enters traversing a data node that is represented by a schema node containing the annotation. A check can then be performed represented by the validation rule as data exits the traversal using data in the dictionary.

Declarative validation rule annotations can be read at 1906, at run time, when the VAX is being applied to a particular message or message type for which it was generated. At 1908, annotations can be applied to relevant portions of the message, and data can be extracted from the message to perform rule validation during message translation. For example, the entire message need not be analyzed when applying validation rules. Rather, only portions of the message or document to which the rules apply need to be extracted for validation. Finally, at 1910, document structure, data and business rules associated with document translation can be validated.

Figure 20:
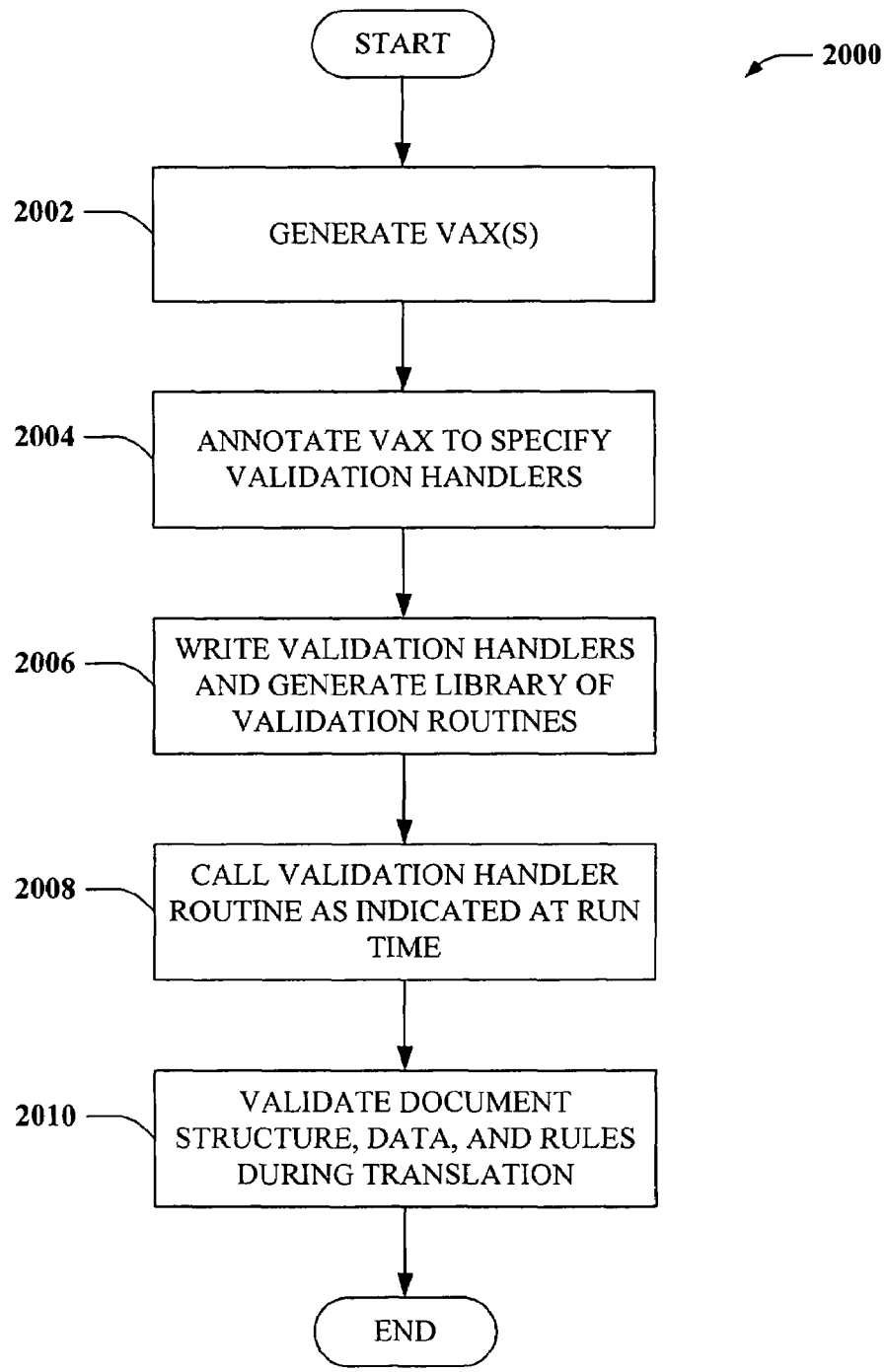
FIG. 20 is an illustration of a methodology 2000 for validating documents during translation to XML-formatted documents using validation handlers, in accordance with an aspect of the subject invention.

FIG. 20 is an illustration of a methodology 2000 for validating documents during translation to XML-formatted documents using validation handlers, in accordance with an aspect of the subject invention. At 2002, one or a plurality of VAXs can be generated, as described with reference to the methodologies presented with regard to FIGS. 17 and 18. At 2004, one or more VAXs can be annotated to include information related to specified validation handlers for particular nodes of the VAX (e.g., segments, fields, components, sub-components, . . . ). Validation handlers can be written at 2006, and provided as a library of predefined routines that facilitate performing validation of document structure, data, and/or translation/transformation rules associated therewith. It is to be appreciated that the validation handler routines can be written at any time prior to 2006, so long as the library of validation routines is provided at 2006. A call to one or more validation handler routines can be made at 2008 upon recognition of the validation handler annotation in the VAX, and the routine can be performed at run time. For instance, when the engine encounters an XSD annotation in the VAX such as "Call validator.dll!routine1, /Xpath1, /Xpath2", the engine can collect values associated with the data fields /Xpath1 and /Xpath2 into a data dictionary as data enters traversing a data node that is represented by a schema node containing the annotation. The handler routine named validator.dll can then be loaded into a main memory and routine1 can be run, passing the data values from the dictionary as data exits the traversal. The engine can utilize values returned from the routine to determine if data in the document is valid according to the schema.

At 2010, the message and/or document can be validated (e.g., a structure thereof, data therein, and/or translation/transformation rules associated therewith can be validated) while it is being translated from flat-file format to XML format for delivery to a destination application. In this manner, the methodology 2000 can facilitate efficient single-pass translation of the message while concurrently providing complex structure, data, and rule validation.

The subject invention (e.g., in connection with generating VAXs, validating documents, etc.) can employ various artificial intelligence based schemes for carrying out various aspects thereof. For example, a process for determining when a message requires a VAX, when and how to validate a message via annotations represented in the VAX, etc., can be facilitated via an automatic classifier system and process. Moreover, where the message is of a type that is likely to be transmitted frequently and to multiple destination applications and/or is likely to be updated or modified often, the classifier can be employed to determine which internal portions of the VAX related thereto require modification, validation, etc.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of relational databases and schema generation, for example, attributes can be data entries or other data-specific attributes derived from the data entries (e.g., database tables, the presence/identity of delimiters, validation annotations, . . . ), and the classes are categories or areas of interest (e.g., segments, fields, components, sub-components, business rules, . . . ).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to, training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions, including but not limited to determining according to a predetermined criteria when a VAX is generated, when it is regenerated (i.e., updated), which portions of the VAX are to be regenerated, etc. The criteria can include, but is not limited to, business rules associated with a particular environment and/or application in which the subject invention is employed, a frequency with which messages require modification, validation of messages, etc.

Figure 21:
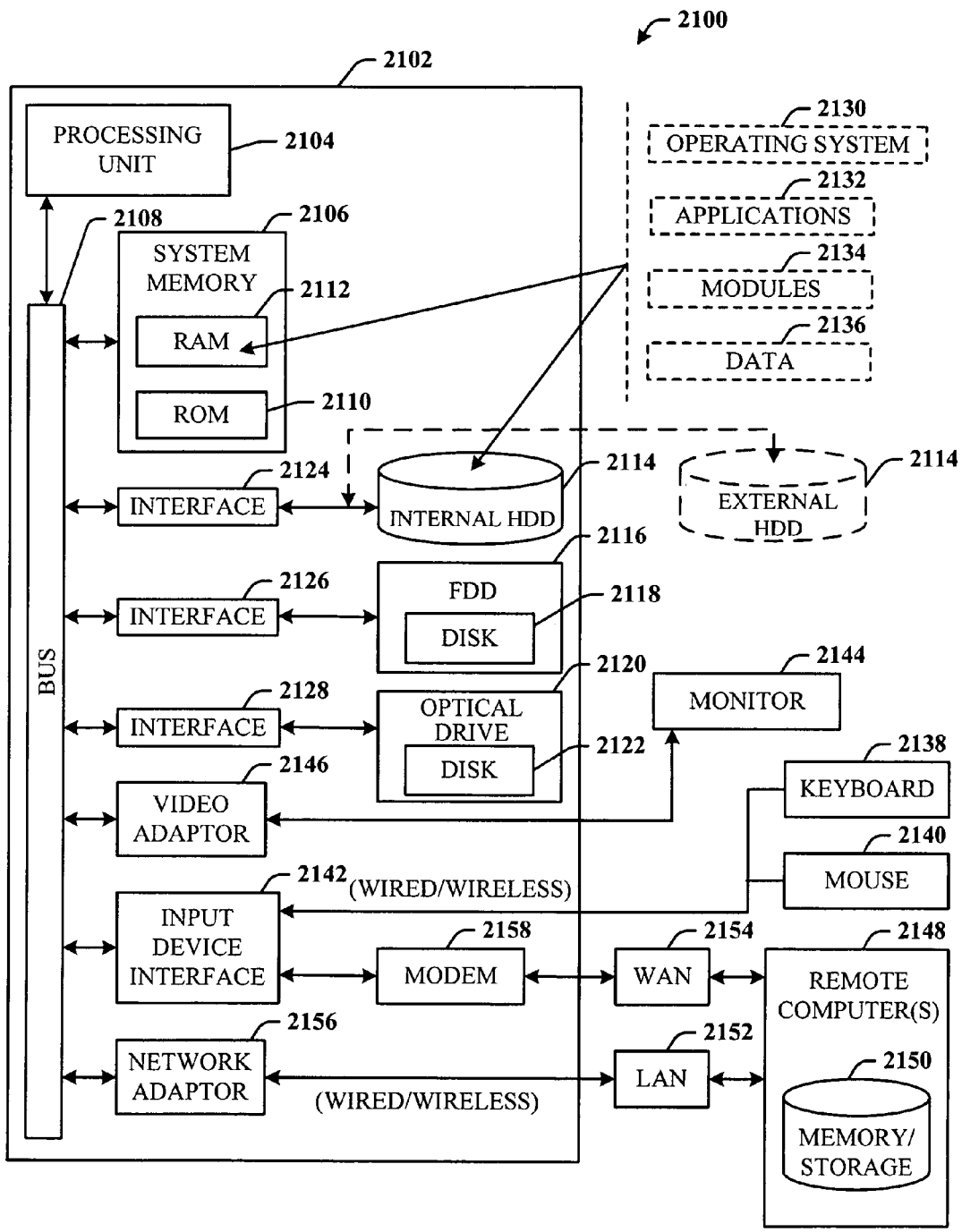
FIG. 21 illustrates a block diagram of a computer operable to execute the disclosed architecture.

Referring now to FIG. 21, there is illustrated a block diagram of a computer operable to execute the disclosed architecture. In order to provide additional context for various aspects of the subject invention, FIG. 21 and the following discussion are intended to provide a brief, general description of a suitable computing environment 2100 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 21, there is illustrated an exemplary environment 2100 for implementing various aspects of the invention that includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 can be any of various commercially available processors. Dual microprocessors and other multi-processor architectures may also be employed as the processing unit 2104.

The system bus 2108 can be any of several types of bus structure that may further interconnect to a memory bus (with or without a memory controller), a peripheral bus, and a local bus using any of a variety of commercially available bus architectures. The system memory 2106 includes read only memory (ROM) 2110 and random access memory (RAM) 2112. A basic input/output system (BIOS) is stored in a non-volatile memory 2110 such as ROM, EPROM, EEPROM, which BIOS contains the basic routines that help to transfer information between elements within the computer 2102, such as during start-up. The RAM 2112 can also include a high-speed RAM such as static RAM for caching data.

The computer 2102 further includes an internal hard disk drive (HDD) 2114 (e.g., EIDE, SATA), which internal hard disk drive 2114 may also be configured for external use in a suitable chassis (not shown), a magnetic floppy disk drive (FDD) 2116, (e.g., to read from or write to a removable diskette 2118) and an optical disk drive 2120, (e.g., reading a CD-ROM disk 2122 or, to read from or write to other high capacity optical media such as the DVD). The hard disk drive 2114, magnetic disk drive 2116 and optical disk drive 2120 can be connected to the system bus 2108 by a hard disk drive interface 2124, a magnetic disk drive interface 2126 and an optical drive interface 2128, respectively. The interface 2124 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 2102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 2112, including an operating system 2130, one or more application programs 2132, other program modules 2134 and program data 2136. All or portions of the operating system, applications, modules, and/or data can also be cached in the RAM 2112. It is appreciated that the subject invention can be implemented with various commercially available operating systems or combinations of operating systems.

A user can enter commands and information into the computer 2102 through one or more wired/wireless input devices, e.g., a keyboard 2138 and a pointing device, such as a mouse 2140. Other input devices (not shown) may include a microphone, an IR remote control, a joystick, a game pad, a stylus pen, touch screen, or the like. These and other input devices are often connected to the processing unit 2104 through an input device interface 2142 that is coupled to the system bus 2108, but can be connected by other interfaces, such as a parallel port, an IEEE 1394 serial port, a game port, a USB port, an IR interface, etc.

A monitor 2144 or other type of display device is also connected to the system bus 2108 via an interface, such as a video adapter 2146. In addition to the monitor 2144, a computer typically includes other peripheral output devices (not shown), such as speakers, printers, etc.

The computer 2102 may operate in a networked environment using logical connections via wired and/or wireless communications to one or more remote computers, such as a remote computer(s) 2148. The remote computer(s) 2148 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory storage device 2150 is illustrated. The logical connections depicted include wired/wireless connectivity to a local area network (LAN) 2152 and/or larger networks, e.g., a wide area network (WAN) 2154. Such LAN and WAN networking environments are commonplace in offices, and companies, and facilitate enterprise-wide computer networks, such as intranets, all of which may connect to a global communication network, e.g., the Internet.

When used in a LAN networking environment, the computer 2102 is connected to the local network 2152 through a wired and/or wireless communication network interface or adapter 2156. The adaptor 2156 may facilitate wired or wireless communication to the LAN 2152, which may also include a wireless access point disposed thereon for communicating with the wireless adaptor 2156. When used in a WAN networking environment, the computer 2102 can include a modem 2158, or is connected to a communications server on the WAN 2154, or has other means for establishing communications over the WAN 2154, such as by way of the Internet. The modem 2158, which can be internal or external and a wired or wireless device, is connected to the system bus 2108 via the serial port interface 2142. In a networked environment, program modules depicted relative to the computer 2102, or portions thereof, can be stored in the remote memory/storage device 2150. It will be appreciated that the network connections shown are exemplary and other means of establishing a communications link between the computers can be used.

The computer 2102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 22:
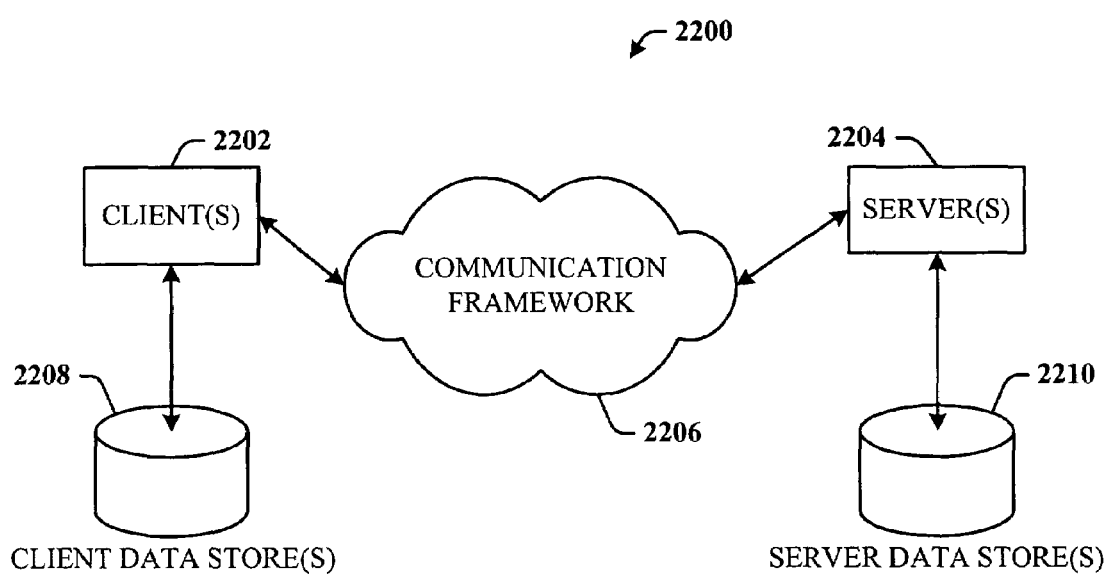
FIG. 22 illustrates a schematic block diagram of an exemplary computing environment in accordance with the subject invention.

Referring now to FIG. 22, there is illustrated a schematic block diagram of an exemplary computing environment 2200 in accordance with the subject invention. The system 2200 includes one or more client(s) 2202. The client(s) 2202 can be hardware and/or software (e.g., threads, processes, computing devices). The client(s) 2202 can house cookie(s) and/or associated contextual information by employing the subject invention, for example. The system 2200 also includes one or more server(s) 2204. The server(s) 2204 can also be hardware and/or software (e.g., threads, processes, computing devices).

The servers 2204 can house threads to perform transformations by employing the subject invention, for example. One possible communication between a client 2202 and a server 2204 can be in the form of a data packet adapted to be transmitted between two or more computer processes. The data packet may include a cookie and/or associated contextual information, for example. The system 2200 includes a communication framework 2206 (e.g., a global communication network such as the Internet) that can be employed to facilitate communications between the client(s) 2202 and the server(s) 2204.

Communications can be facilitated via a wired (including optical fiber) and/or wireless technology. The client(s) 2202 are operatively connected to one or more client data store(s) 2208 that can be employed to store information local to the client(s) 2202 (e.g., cookie(s) and/or associated contextual information). Similarly, the server(s) 2204 are operatively connected to one or more server data store(s) 2210 that can be employed to store information local to the servers 2204.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An computer-implemented system that facilitates converting structured documents to XML format; comprising a processor executing the following components stored in computer readable storage media:
   an integration engine that receives a structured document and translates the document to XML format;
   a parser component that parses the structured document according to delimiter information associated with the structured document;
   a schema generation component that configures an XML schema definition (XSD) from a delimited flat-file HL 7 (Health Level 7) message based at least in part on delimiter information of the message by the parsing component and adds validation annotations to the XSD to generate a value-added XSD (VAX), the validation annotations are associated with declarative validation rules with regard to respective nodes in an XSD;
   a validation component that validates the message at run time, the validation is performed by reading declarative rules and extracting data related to specific node associated with the annotation; and
   an acknowledgement generation component that generates an acknowledgement related to each of message receipt and message validation and transmits the acknowledgement to a source application over a socket connect over which the message was transmitted from the source application.

2. The system of claim 1, the delimited flat-file HL7 message is encoded using ER7 (pipe and hat encoding) protocols.

3. The system of claim 1, the parsing component employs delimiter information associated with the message to regroup data segments, data fields, data components, and data sub-components, respectively, in a hierarchical node arrangement.

4. The system of claim 3, further comprising an ambiguity resolution component that tracks segments that occur in the message and contextual information related to the segments to resolve ambiguity when regrouping information in the hierarchical node arrangement.

5. The system of claim 4, the ambiguity resolution component resolves an ambiguous schema node in favor of a node with a closest Cartesian proximity to the ambiguous node.

6. The system of claim 3, the parser component is a pull-based parser-and-serializer component that facilitates conversion from flat-file format to XML format when parsing and from XML format to flat-file format when serializing.

7. The system of claim 3, further comprising a schema compiler that translates the VAX to a compact translation specification at run time, the translation specification represents the VAX as a collection of segment objects with grouping information that applies to at least one segment.

8. The system of claim 7, the integration engine caches information related to nodes in the VAX, the cached information comprises properties related to at least one of child node spatial position and follow set information.

9. The system of claim 1, follow set information comprises a set of delimiters with which data associated with a given node can end.

10. A computer-implemented method of translating and validating structured documents to XML format at run time, comprising at least a processor executing the following steps:
    receiving and storing into a computer readable storage medium an incoming delimited flat file HL7 document;
    parsing the incoming delimited flat file HL7 (Health Level 7) document into a hierarchical arrangement comprising segments, fields, components and sub-components, respectively, according to delimiter information in the structured document; generating a VAX (value-added eXtensible Markup Language schema definition) from the delimited document with validation annotations regarding validation of data and structure of one or more nodes in the VAX;
    generating a translation specification comprising read-only information at run time by compiling the VAX;
    generating a plurality of private instances of the translation specification for association with multiple applications consuming the incoming flat file document;
    extracting information related to data value and position in the delimited document and comparing the extracted information to compiled validation annotations to validate the document;
    generating a single acknowledgement that the document has been both received and validated; and
    transmitting the acknowledgement to a source application over a socket connection via which the source application transmitted the document;
    broadcasting the incoming flat file document to the various applications in a message format acceptable to each of the various applications.

11. The method of claim 10, generating a VAX comprises grouping segments according to at least one of sequence and choice ordering schemes.

12. The method of claim 11, further comprising resolving ambiguity with regard to a node in the VAX when position of the node is uncertain.

13. The method of claim 12, resolving ambiguity with regard to an ambiguous node comprises associating the ambiguous node with a parent node having a closer Cartesian proximity to the ambiguous node than any other parent node.

14. A computer-implemented system that facilitates flat-file delimited message processing and validation, comprising:

means for storing a flat-file delimited message; means for parsing the flat-file delimited message; means for reorganizing data in the flat-file-delimited message;

means for generating an XSD schema that represents the structure of reorganized data;

means for annotating the XSD schema with information related to validation rules for the flat-file delimited message;

means for compiling the annotated XSD schema to generate a translation specification such that the translation specification is employed across a plurality of document instances thereby generating multiple versions of the received message, wherein the versions are in accordance with formats acceptable to respective destination applications consuming the received message;

means for concurrently translating and validating the flat-file delimited message into XML format in a single pass; and means for generating an acknowledgment regarding receipt and validation of the flat-file delimited message and transmitting the acknowledgement over a socket connection via which the flat-file delimited message is transmitted to the means for receiving flat-file delimited message.

15. The system of claim 14, further comprising means for resolving ambiguity with regard to node arrangement in the XSD schema.

16. The system of claim 1, wherein the integration engine generates a plurality of messages formatted in accordance with formatting requirements associated with a plurality of consuming applications.

* * * * *